(12) United States Patent
Minamiru et al.

(10) Patent No.: US 11,599,610 B2
(45) Date of Patent: Mar. 7, 2023

(54) LIGHT-EMITTING DEVICE, OPTICAL DEVICE, AND INFORMATION PROCESSING APPARATUS

(71) Applicant: FUJIFILM Business Innovation Corp., Tokyo (JP)

(72) Inventors: Takeshi Minamiru, Kanagawa (JP); Satoshi Inada, Kanagawa (JP); Kenichi Ono, Kanagawa (JP); Takafumi Higuchi, Kanagawa (JP); Tsutomu Otsuka, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 528 days.

(21) Appl. No.: 16/708,348

(22) Filed: Dec. 9, 2019

(65) Prior Publication Data

US 2020/0285833 A1 Sep. 10, 2020

(30) Foreign Application Priority Data

Mar. 5, 2019 (JP) .............................. JP2019-039586

(51) Int. Cl.
| | | |
|---|---|---|
| *G06F 21/32* | (2013.01) |
| *H01L 33/62* | (2010.01) |
| *H01S 5/042* | (2006.01) |
| *H01L 31/16* | (2006.01) |
| *H01S 5/42* | (2006.01) |
| *H01S 5/02325* | (2021.01) |
| *G06V 40/16* | (2022.01) |
| *H01S 5/00* | (2006.01) |
| *H01S 5/183* | (2006.01) |
| *H01S 5/343* | (2006.01) |

(52) U.S. Cl.
CPC ............ *G06F 21/32* (2013.01); *G06V 40/166* (2022.01); *H01L 31/16* (2013.01); *H01L 33/62* (2013.01); *H01S 5/02325* (2021.01); *H01S 5/04254* (2019.08); *H01S 5/423* (2013.01); *H01S 5/005* (2013.01); *H01S 5/18313* (2013.01); *H01S 5/18361* (2013.01); *H01S 5/3432* (2013.01)

(58) Field of Classification Search
CPC ......................... H01S 5/18313; H01S 5/18361
See application file for complete search history.

(56) References Cited

U.S. PATENT DOCUMENTS

| | | |
|---|---|---|
| 10,069,275 B1 | 9/2018 | Lee et al. |
| 2015/0069113 A1 | 3/2015 | Wang et al. |

(Continued)

FOREIGN PATENT DOCUMENTS

| | | |
|---|---|---|
| JP | 2009054804 | 3/2009 |
| JP | 2009231440 | 10/2009 |

(Continued)

OTHER PUBLICATIONS

"Office Action of Japan Counterpart Application", dated Oct. 18, 2022, with English translation thereof, pp. 1-11.

*Primary Examiner* — Tuan N Nguyen
(74) *Attorney, Agent, or Firm* — JCIPRNET

(57) ABSTRACT

A light-emitting device includes a light diffusing member that diffuses light emitted from a light source so that an object to be measured is irradiated with the light; and a holding unit that holds the light diffusing member and is provided on a wire connected to the light source so as to be located in an uncoated region of the wire.

16 Claims, 13 Drawing Sheets

(56) References Cited

U.S. PATENT DOCUMENTS

2015/0362776 A1\* 12/2015 Jikumaru .............. H01L 27/124
　　　　　　　　　　　　　　　　　　　　　　349/12
2019/0335073 A1　10/2019　Yamashita et al.

FOREIGN PATENT DOCUMENTS

| JP | 2018-054769 | 4/2018 |
| WO | 2018-061816 | 4/2018 |
| WO | 2018064411 | 4/2018 |

\* cited by examiner

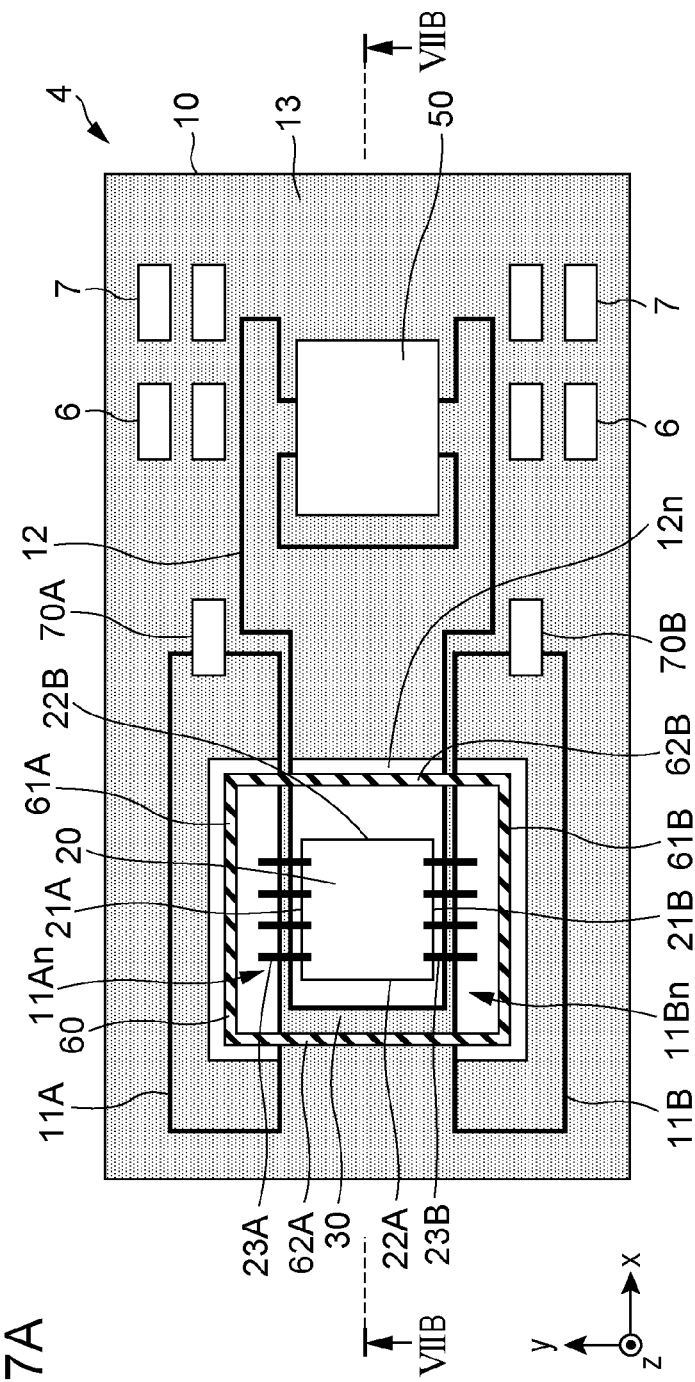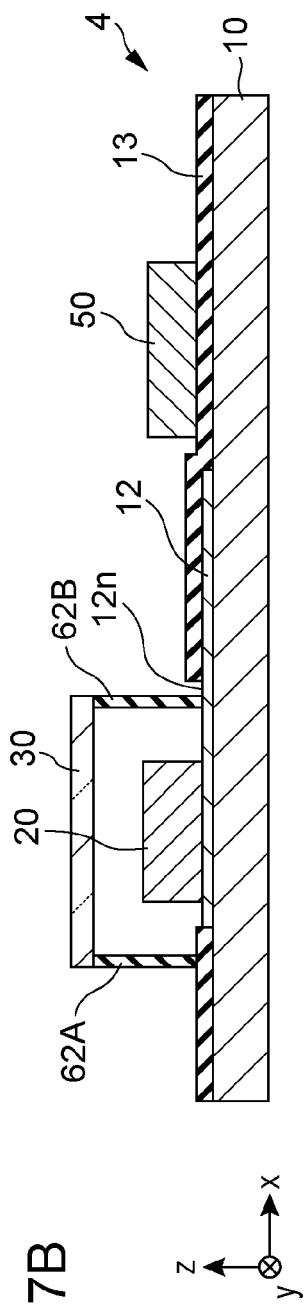

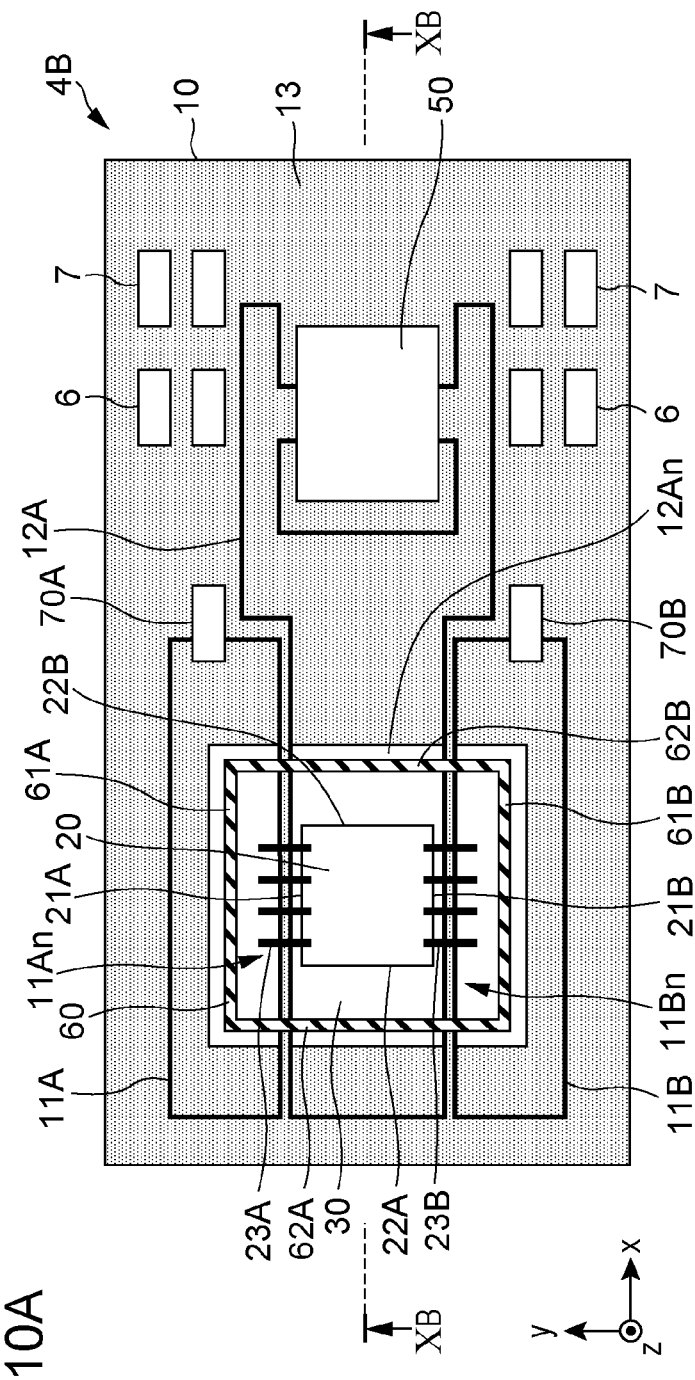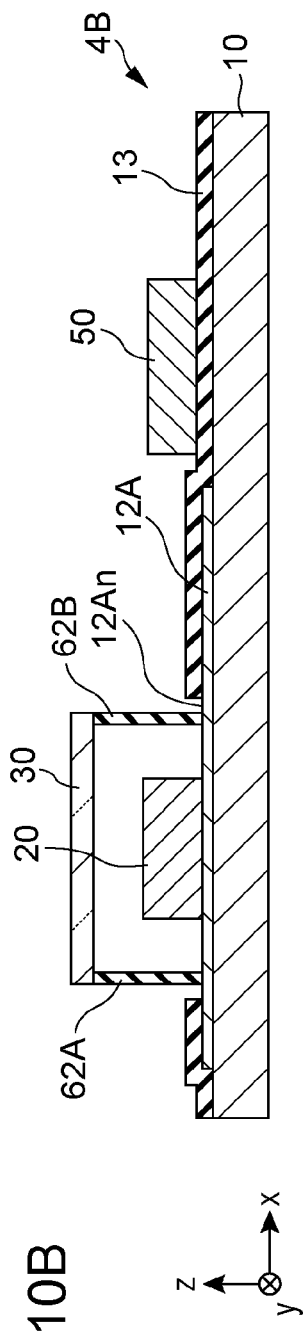

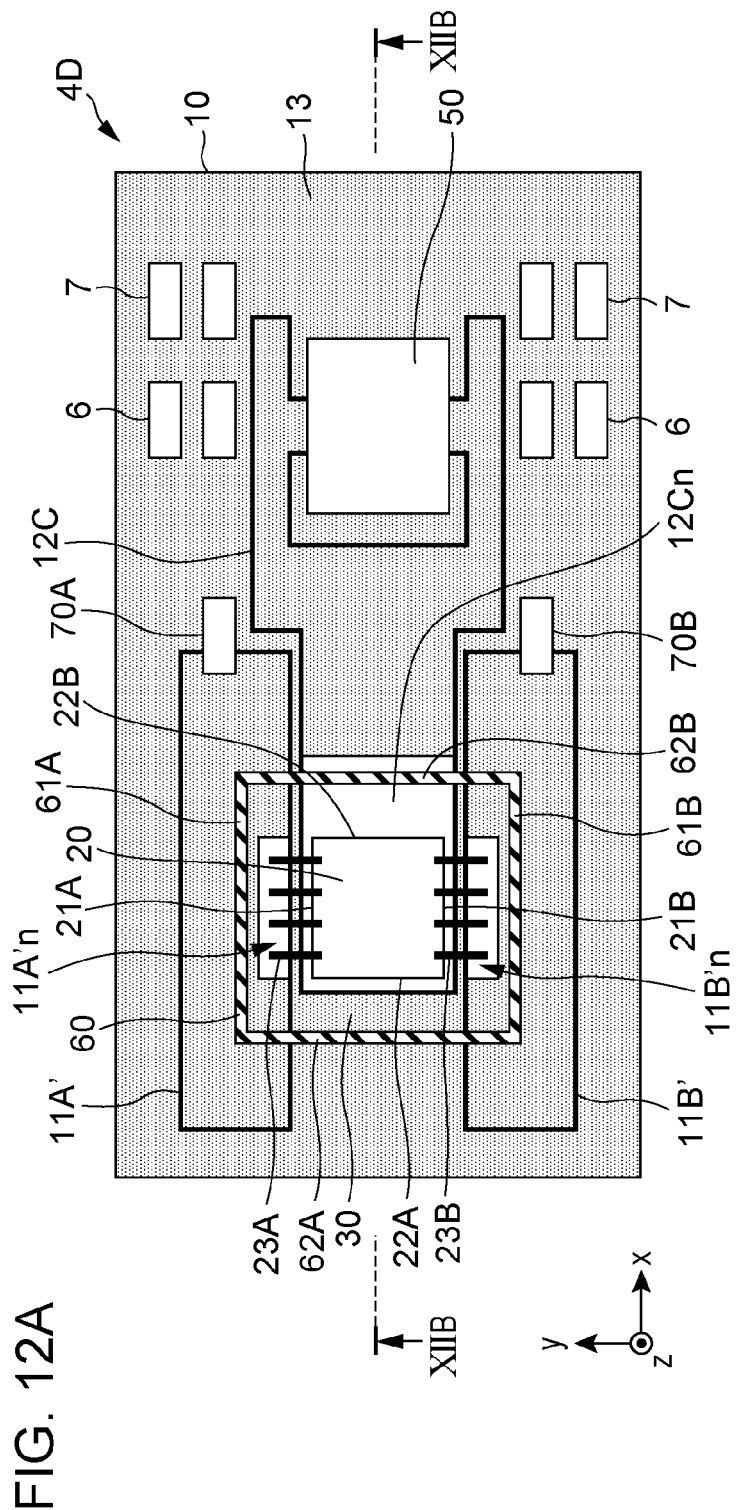
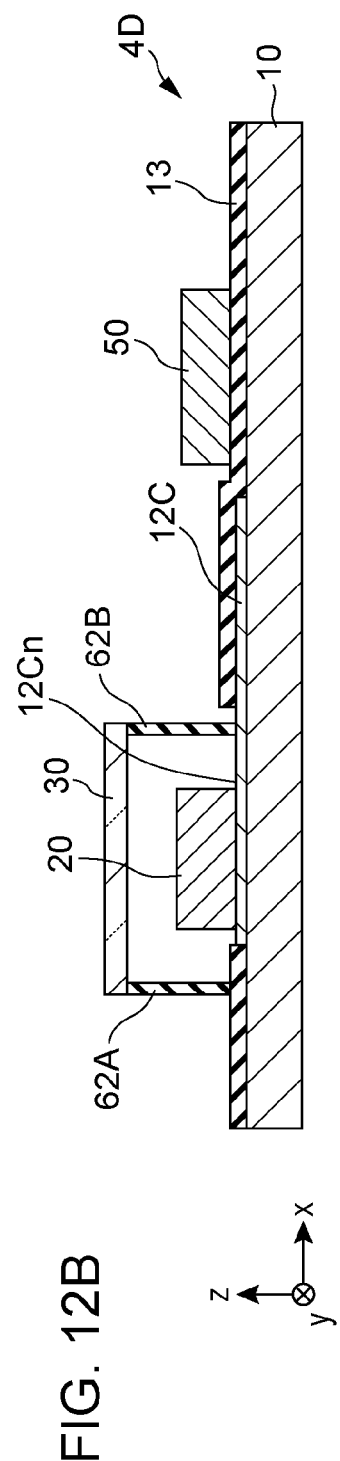
FIG. 12A
FIG. 12B

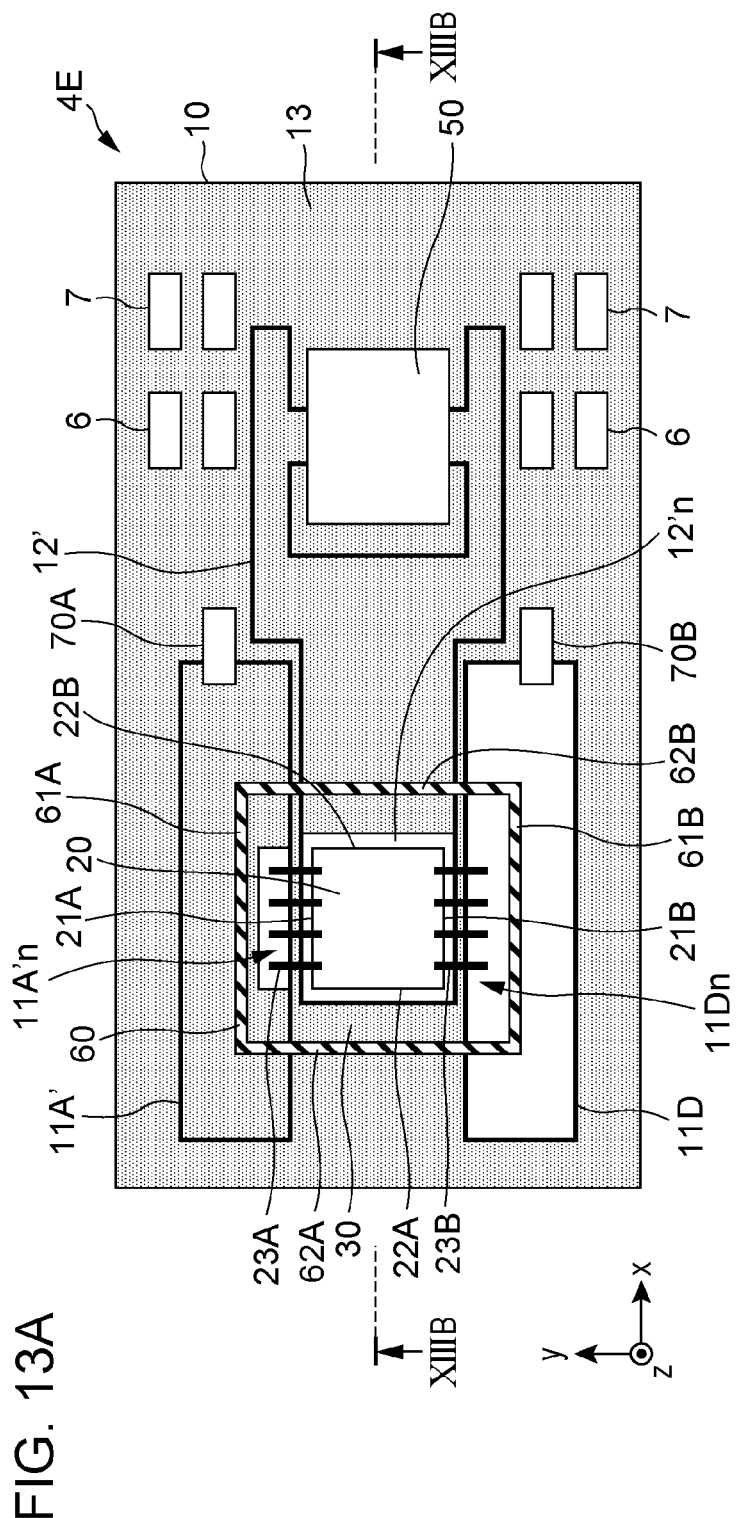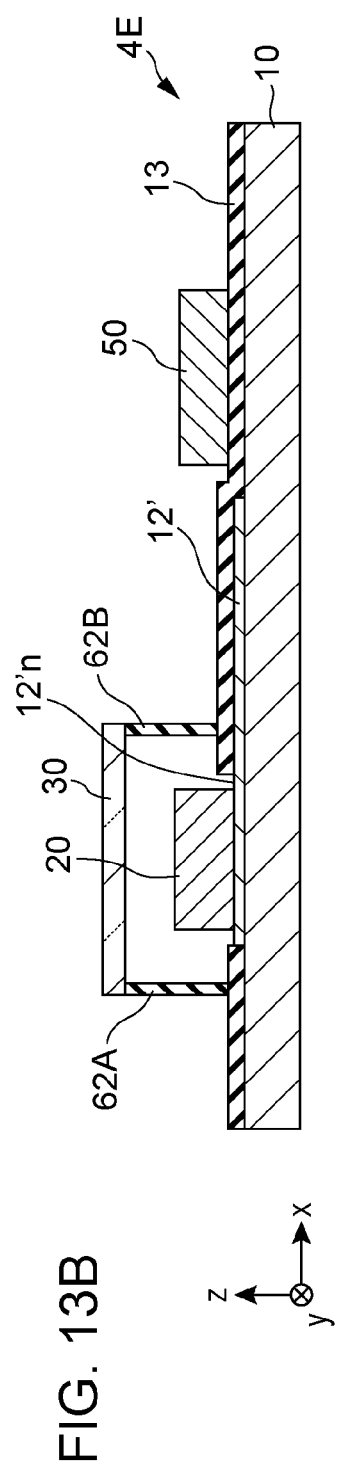

LIGHT-EMITTING DEVICE, OPTICAL DEVICE, AND INFORMATION PROCESSING APPARATUS

CROSS-REFERENCE TO RELATED APPLICATIONS

This application is based on and claims priority under 35 USC 119 from Japanese Patent Application No. 2019-039586 filed Mar. 5, 2019.

BACKGROUND

(i) Technical Field

The present disclosure relates to a light-emitting device, an optical device, and an information processing apparatus.

(ii) Related Art

Japanese Unexamined Patent Application Publication No. 2018-54769 describes an imaging device that includes a light source, a light diffusing member that has plural lenses disposed adjacent to one another on a predetermined plane and diffuses light emitted from the light source, and an imaging element that receives light diffused by the light diffusing member and then reflected by a subject, wherein the plural lenses are disposed so that a cycle of an interference fringe of the diffused light is three pixels or less.

SUMMARY

In three-dimensional measurement using a Time of Flight (ToF) method, light emitted from a light source is diffused through a light diffusing member held by a holding unit so that an object to be measured is irradiated with the light, and a three-dimensional shape of the object to be measured is measured based on the reflected light.

The light source used for three-dimensional measurement using a Time of Flight (ToF) method needs to radiate light to a wider range than a light source for simple distance measurement and therefore needs to be a large-output light source.

It is desirable that, for example, a light-emitting device using such a large-output light source efficiently release heat generated by the light source.

Aspects of non-limiting embodiments of the present disclosure relate to a light-emitting device and the like that have a structure that allows heat generated by a light source to be easily released as compared with a case where a holding unit that holds a light diffusing member is provided in a coated region on a substrate.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a light-emitting device including a light diffusing member that diffuses light emitted from a light source so that an object to be measured is irradiated with the light; and a holding unit that holds the light diffusing member and is provided on a wire connected to the light source so as to be located in an uncoated region of the wire.

BRIEF DESCRIPTION OF THE DRAWINGS

Exemplary embodiments of the present disclosure will be described in detail based on the following figures, wherein:

FIG. 5A is a plan view, and FIG. 5B is a cross-sectional view taken along line VB-VB of FIG. 5A;

FIGS. 7A and 7B are views for explaining a light-emitting device to which a first exemplary embodiment is applied, FIG. 7A is a plan view, and FIG. 7B is a cross-sectional view taken along line VIIB-VIIB of FIG. 7A;

FIG. 8A is a plan view, and FIG. 8B is a cross-sectional view taken along line VIIIB-VIIIB of FIG. 8A;

FIG. 9A is a plan view, and FIG. 9B is a cross-sectional view taken along line IXB-IXB of FIG. 9A;

FIGS. 10A and 10B are views for explaining a light-emitting device to which a third exemplary embodiment is applied, FIG. 10A is a plan view, and FIG. 10B is a cross-sectional view taken along line XB-XB of FIG. 10A;

FIG. 11A is a plan view, and FIG. 11B is a cross-sectional view taken along line XIB-XIB of FIG. 11A;

FIGS. 12A and 12B are views for explaining a light-emitting device to which a fifth exemplary embodiment is applied, FIG. 12A is a plan view, and FIG. 12B is a cross-sectional view taken along line XIIB-XIIB of FIG. 12A; and FIGS. 13A and 13B are views for explaining a light-emitting device to which a sixth exemplary embodiment is applied, FIG. 13A is a plan view, and FIG. 13B is a cross-sectional view taken along line XIIIB-XIIIB of FIG. 13A.

DETAILED DESCRIPTION

Exemplary embodiments of the present disclosure are described in detail below with reference to the attached drawings.

An information processing apparatus is often configured to determine whether or not a user who has accessed the information processing apparatus is permitted to access the information processing apparatus and permit the user to use the information processing apparatus only in a case where the information processing apparatus authenticates the user as a user permitted to access the information processing apparatus. Conventionally, a method for authenticating a user by using a password, a fingerprint, an iris, or the like has been used. Recently, there are demands for an authentication method that provides higher security. One example of such a method is authentication using a three-dimensional image such as a shape of a user's face.

The following discusses a mobile information processing terminal as an example of the information processing apparatus and discusses a case where a user is authenticated by recognizing a shape of a face captured as a three-dimensional image. Note that the information processing apparatus is also applicable to information processing apparatuses, such as a personal computer (PC), other than a mobile information terminal.

Furthermore, the configurations, functions, methods, and the like described in the exemplary embodiments are also applicable to recognition of a three-dimensional shape other than recognition of a shape of a face, that is, applicable to recognition of a shape of an object other than a face. Furthermore, a distance to an object to be measured may be any distance.

First Exemplary Embodiment

Information Processing Apparatus 1

Figure 1:
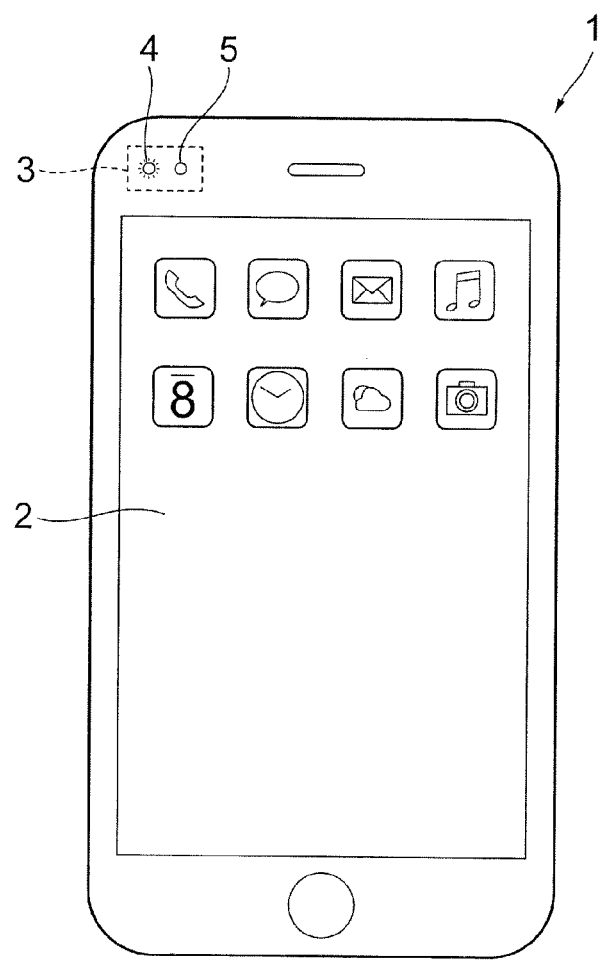
FIG. 1 illustrates an example of an information processing apparatus.

FIG. 1 illustrates an example of an information processing apparatus 1. As described above, the information processing apparatus 1 is, for example, a mobile information processing terminal.

The information processing apparatus 1 includes a user interface unit (hereinafter referred to as a UI unit) 2 and an optical device 3 that acquires a three-dimensional image. For example, the UI unit 2 is configured such that a display device that displays information for a user and an input device that receives an instruction concerning information processing based on a user's operation are unified. The display device is, for example, a liquid crystal display device or an organic EL display device, and the input device is, for example, a touch panel.

The optical device 3 includes a light-emitting device 4 and a three-dimensional sensor (hereinafter referred to as a 3D sensor) 5. The light-emitting device 4 radiates light toward an object to be measured (toward a face in this example) in order to acquire a three-dimensional image. The 3D sensor 5 acquires light radiated from the light-emitting device 4 and then reflected back by a face. In this example, a three-dimensional image of a face is acquired based on a flight time of light by using a Time of Flight (ToF) method. Hereinafter, a face is referred to as an object to be measured even in a case where a three-dimensional image of a face is acquired. Note that a three-dimensional image of an object other than a face may be acquired. Acquisition of a three-dimensional image is sometimes referred to as 3D sensing.

The information processing apparatus 1 is a computer including a CPU, a ROM, and a RAM. Examples of the ROM include a non-volatile rewritable memory such as a flash memory. A program and a constant accumulated in the ROM are loaded into the RAM and are executed by the CPU, and thereby the information processing apparatus 1 operates to execute various kinds of information processing.

Figure 2:
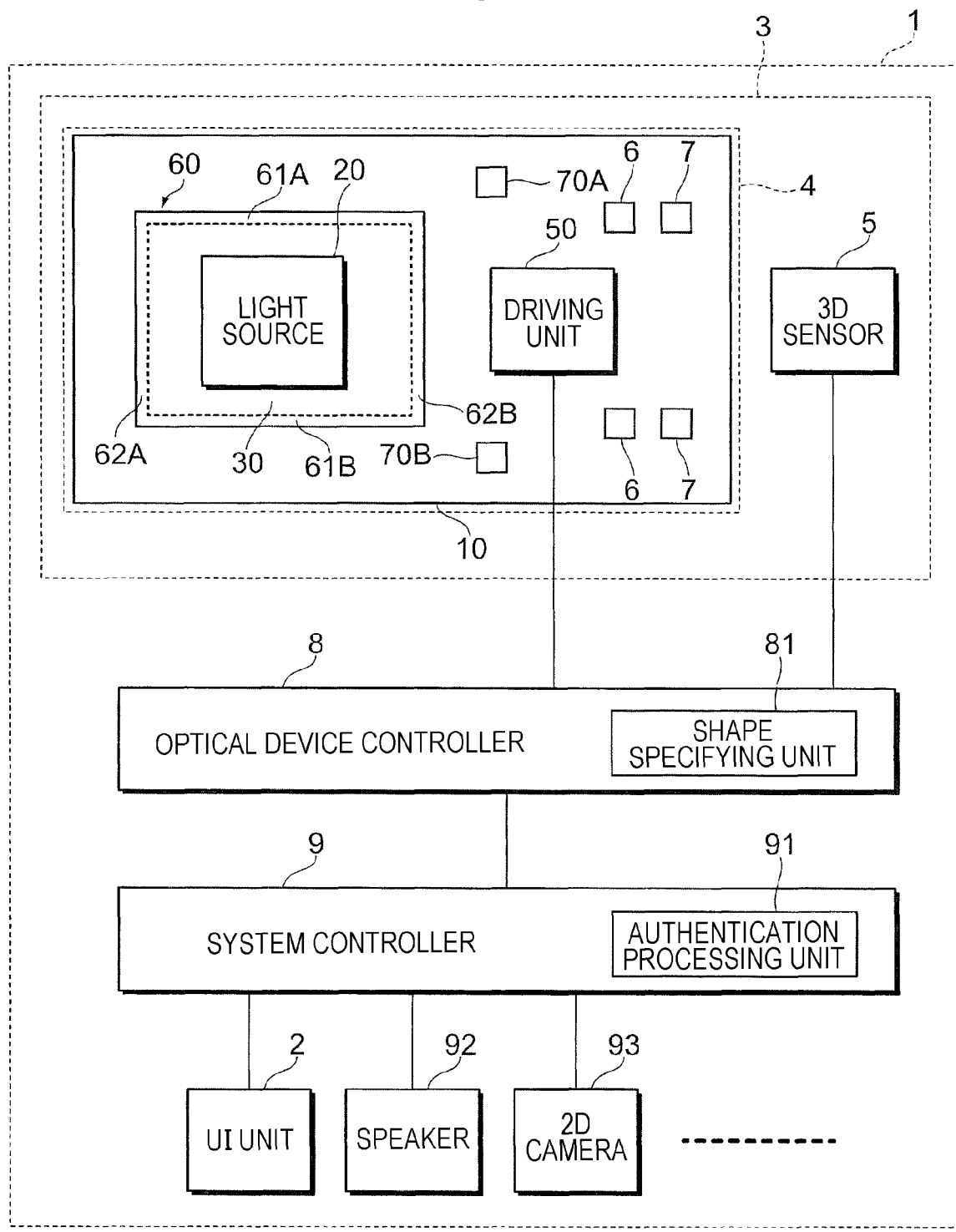
FIG. 2 is a block diagram for explaining a configuration of the information processing apparatus.

FIG. 2 is a block diagram for explaining a configuration of the information processing apparatus 1.

The information processing apparatus 1 includes the optical device 3, an optical device controller 8, and a system controller 9. The optical device controller 8 controls the optical device 3. The optical device controller 8 includes a shape specifying unit 81. The system controller 9 controls the whole information processing apparatus 1 as a system. The system controller 9 includes an authentication processing unit 91. Members such as the UI unit 2, a speaker 92, and a two-dimensional camera (referred to as a 2D camera in FIG. 2) 93 are connected to the system controller 9. The 3D sensor 5 is an example of a light receiving unit.

These constituent elements are described below in order.

The light-emitting device 4 includes a substrate 10, a light source 20, a light diffusing member 30, a driving unit 50, a holding unit 60, and capacitors 70A and 70B. The light source 20, the driving unit 50, and the capacitors 70A and 70B are provided on the substrate 10. The capacitors 70A and 70B are referred to as capacitors 70 in a case where the capacitors 70A and 70B are not distinguished from each other. Although the two capacitors 70A and 70B are illustrated, the number of capacitors 70 may be one or may be more than two. Furthermore, passive elements such as a resistive element 6 and a capacitor 7 are provided on the substrate 10 so that the driving unit 50 operates. Plural resistive elements 6 may be provided, and plural capacitors 7 may be provided.

As described later, the light diffusing member 30 is held at a predetermined distance from the substrate 10 by the holding unit 60 so as to cover the light source 20. The state where the light diffusing member 30 covers the light source 20 refers to a state where the light diffusing member 30 is provided on an optical axis of light emitted from the light source 20 so that the light emitted from the light source 20 passes through the light diffusing member 30. That is, this state refers to a state where the light source 20 and the light diffusing member 30 overlap each other in plan view (when viewed in an xy plane illustrated, for example, in FIGS. 3 and 7A, which will be described later) as described later.

The light source 20 of the light-emitting device 4 is a light-emitting element array including plural light-emitting elements that are two-dimensional arranged (see FIG. 3, which will be described later). The light-emitting elements are, for example, vertical cavity surface emitting lasers (VCSELs). Hereinafter, it is assumed that the light-emitting elements are vertical cavity surface emitting lasers (VCSELs). The vertical cavity surface emitting lasers (VCSELs) are referred to as VCSELs. The light source 20 emits light in a direction perpendicular to the substrate 10. In a case where three-dimensional sensing is performed by using a ToF method, the light source 20 is required to emit, for example, pulsed light of 100 MHz or more whose rise time is 1 ns or less by the driving unit 50. Hereinafter, pulsed light emitted from the light source 20 is referred to as an emitted light pulse. For example, in a case of face authentication, a distance over which light is radiated is approximately 10 cm to approximately 1 m. A range of measurement of a 3D shape of an object to be measured is approximately 1 m square. Accordingly, the light source 20 is a large-output light source, and therefore it is required that heat generated by the light source 20 be efficiently released. The distance over which light is radiated is referred to as a measurement distance, and the range of measurement of a 3D shape of an object to be measured is referred to as a measurement range or an irradiation range. A plane virtually provided in the measurement range or the irradiation range is referred to as an irradiation plane.

Details of the substrate 10, the light source 20, the light diffusing member 30, the driving unit 50, and the holding unit 60 of the light-emitting device 4 will be described later.

The 3D sensor 5 includes plural light receiving cells. For example, each of the light receiving cells is configured to receive pulsed light that is an emitted light pulse from the light source 20 reflected by an object to be measured and accumulate an electric charge corresponding to a period it takes for the light to be received. Hereinafter, the reflected pulsed light thus received is referred to as a received pulse. The 3D sensor 5 is a device having a CMOS structure in which each light receiving cell includes two gates and electric charge accumulating units corresponding to the two gates. By alternately applying a pulse to the two gates, a generated photoelectron is transferred to any of the two electric charge accumulating units at a high speed. In the two electric charge accumulating units, an electric charge according to a phase difference between an emitted light pulse and a received pulse is accumulated. The 3D sensor 5 outputs, for each light receiving cell as a signal, a digital value according to a phase difference between an emitted light pulse and a received pulse through an AD converter. That is, the 3D sensor 5 outputs a signal corresponding to a period from emission of light from the light source 20 to reception of the light by the 3D sensor 5. The AD converter may be provided in the 3D sensor 5 or may be provided outside the 3D sensor 5.

The shape specifying unit 81 of the optical device controller 8 acquires a digital value obtained for each light receiving cell from the 3D sensor 5 and calculates a distance to the object to be measured for each light receiving cell. Then, the shape specifying unit 81 specifies a 3D shape of the object to be measured based on the calculated distance.

The authentication processing unit 91 of the system controller 9 performs authentication processing concerning use of the information processing apparatus 1 in a case where a 3D shape of an object to be measured specified by the shape specifying unit 81 is a 3D shape accumulated in advance, for example, in the ROM. Note that the authentication processing concerning use of the information processing apparatus 1 is, for example, processing for determining whether or not to permit use of the information processing apparatus 1. For example, in a case where it is determined that a 3D shape of a face that is an object to be measured matches a face shape stored in a storage member such as the ROM, use of the information processing apparatus 1 including various applications offered by the information processing apparatus 1 is permitted.

The shape specifying unit 81 and the authentication processing unit 91 are, for example, realized by a program. Alternatively, the shape specifying unit 81 and the authentication processing unit 91 may be realized by an integrated circuit such as an ASIC or an FPGA. Alternatively, the shape specifying unit 81 and the authentication processing unit 91 may be realized by software such as a program and an integrated circuit such as an ASIC.

Although the optical device 3, the optical device controller 8, and the system controller 9 are separately illustrated in FIG. 2, the system controller 9 may include the optical device controller 8. Alternatively, the optical device controller 8 may be included in the optical device 3. Alternatively, the optical device 3, the optical device controller 8, and the system controller 9 may be integral with each other.

Next, the light source 20, the light diffusing member 30, the driving unit 50, and the capacitors 70 that constitute the light-emitting device 4 are described before description of the light-emitting device 4.

Configuration of Light Source 20

Figure 3:
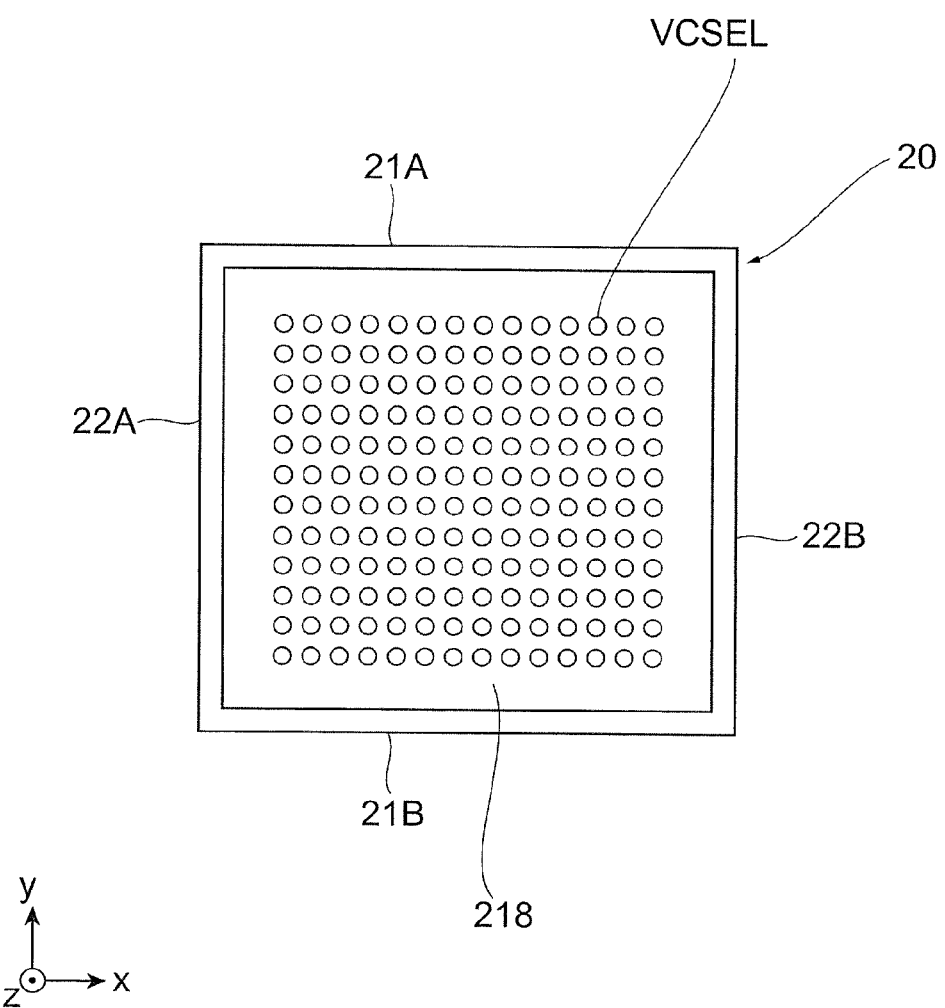
FIG. 3 is a plan view of a light source.

FIG. 3 is a plan view of the light source 20. The light source 20 includes plural VCSELs that are arranged in a two-dimensional array. It is assumed that the rightward direction and the upward direction of the paper on which FIG. 3 is drawn are an x direction and a y direction, respectively. A direction orthogonal to the x direction and the y direction in anticlockwise direction is a z direction. The z, y, and z directions are common to all of the drawings.

Each of the VCSELs is a light-emitting element configured such that an active region that serves as a light-emitting region is provided between a lower multilayer film reflector and an upper multilayer film reflector stacked on the semiconductor substrate 200 (see FIG. 4, which will be described later) and emits laser light in a direction perpendicular to the semiconductor substrate 200. It is therefore easy to arrange the VCSELs in a two-dimensional array. The number of VCSELs included in the light source 20 is, for example, 100 to 1000. The plural VCSELs are connected in parallel and are driven in parallel. The number of VCSELs described above is an example and need just be set in accordance with the measurement distance and the measurement range.

An anode electrode 218 (see FIG. 4, which will be described later) common to the plural VCSELs is provided on a surface of the light source 20. The anode electrode 218 is connected to anode wires 11A and 11B (see FIG. 7, which will be described later) provided on the substrate 10 through a bonding wire as described later. A cathode electrode 214 is provided on a rear surface of the light source 20 (see FIG. 4, which will be described later). The cathode electrode 214 is joined to a part with which the cathode electrode 214 makes contact and that is a part of a cathode wire 12 (see FIG. 7, which will be described later) provided on the substrate 10 with use of an electrically-conductive adhesive. The electrically-conductive adhesive is, for example, silver paste. The anode wires 11A and 11B are sometimes referred to as anode wires, and the cathode wire 12 is sometimes referred to as a cathode wire. Furthermore, these wires are sometimes referred to as wires connected to the light source 20. The same applies to other cases.

In this example, it is assumed that a planar shape of the light source 20 that is a shape viewed in plan view is a quadrangle. A side surface on a +y direction side is referred to as a side surface 21A, a side surface on a −y direction side is referred to as a side surface 21B, a side surface on a −x direction side is referred to as a side surface 22A, and a side surface on a +x direction side is referred to as a side surface 22B. The side surface 21A and the side surface 21B face each other. The side surface 22A and the side surface 22B connect the side surface 21A and the side surface 21B and face each other. The side surface 21A is an example of a first side surface, the side surface 21B is an example of a second side surface, the side surface 22A is an example of a third side surface, and the side surface 22B is an example of a fourth side surface.

Structure of VCSEL

Figure 4:
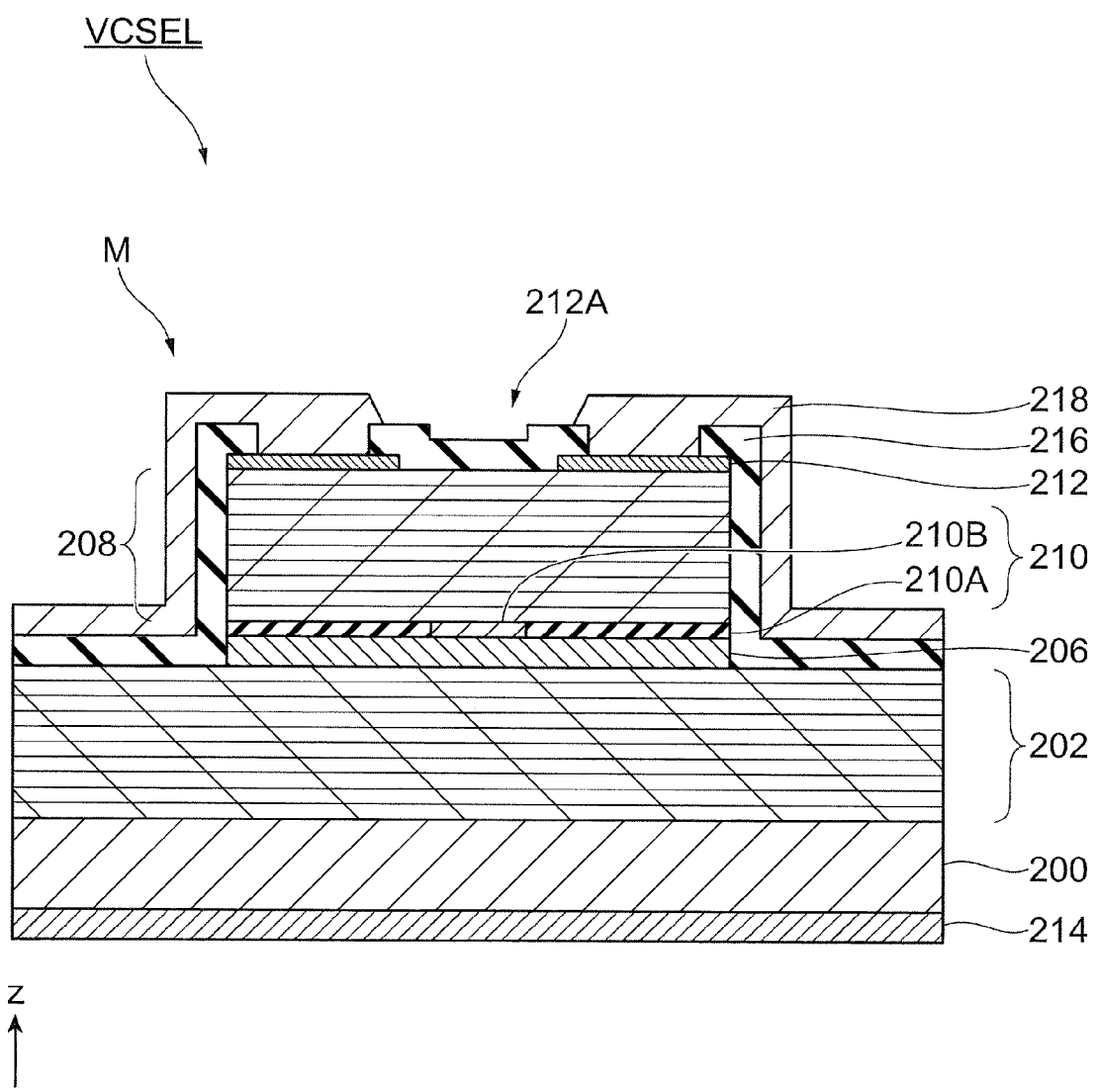
FIG. 4 is a view for explaining a cross-section structure of a single VCSEL in the light source.

FIG. 4 is a view for explaining a cross-section structure of a single VCSEL in the light source 20. The VCSEL is a VCSEL having a λ resonator structure. The upward direction of the paper on which FIG. 4 is drawn is the z direction.

The VCSEL is configured such that an n-type lower distributed bragg reflector (DBR) 202 in which AlGaAs layers having different Al compositions are alternately stacked, an active region 206 including a quantum well layer sandwiched between an upper spacer layer and a lower spacer layer, and a p-type upper distributed bragg reflector 208 in which AlGaAs layers having different Al compositions are alternately stacked are stacked in order on the semiconductor substrate 200 such as n-type GaAs. Hereinafter, a distributed bragg reflector is referred to as a DBR.

The n-type lower DBR 202 is a multilayer body including pairs of an $Al_{0.9}Ga_{0.1}As$ layer and an GaAs layer, each of the layers has a thickness of $\lambda/4n_r$ ($\lambda$ is an oscillation wavelength, and $n_r$ is a refractive index of a medium), and 40 pairs of these layers are stacked so that these layers are alternately provided. A carrier concentration after doping of silicon, which is an n-type impurity, is, for example, $3 \times 10^{18}$ $cm^{-3}$.

The active region 206 is configured such that the lower spacer layer, the quantum well active layer, and the upper spacer layer are stacked. For example, the lower spacer layer is an undoped $Al_{0.6}Ga_{0.4}As$ layer, the quantum well active layer is an undoped InGaAs quantum well layer and an undoped GaAs barrier layer, and the upper spacer layer is an undoped $Al_{0.6}Ga_{0.4}As$ layer.

The p-type upper DBR 208 is a multilayer body including pairs of a p-type $Al_{0.9}Ga_{0.1}As$ layer and a GaAs layer, each of the layers has a thickness of $\lambda/4n_r$, and 29 pairs of these layers are stacked so that these layers are alternately provided. A carrier concentration after doping of carbon, which is a p-type impurity, is, for example, $3\times10^{18}$ $cm^{-3}$. Desirably, a contact layer made of p-type GaAs is formed in a topmost layer of the upper DBR 208, and a p-type AlAs current confinement layer 210 is formed in a lowermost layer of the upper DBR 208 or in an inner part of the upper DBR 208.

By etching a semiconductor layer stacked from the upper DBR 208 to the lower DBR 202, a cylindrical mesa M is formed on the semiconductor substrate 200. This causes the current confinement layer 210 to be exposed on a side surface of the mesa M. An oxidized region 210A oxidized from the side surface of the mesa M and an electrically-conductive region 210B surrounded by the oxidized region 210A are formed in the current confinement layer 210 by an oxidation process. In the oxidation process, an oxidation speed of the AlAs layer is higher than an oxidation speed of the AlGaAs layer, and the oxidized region 210A is oxidized from the side surface of the mesa M toward an inside of the mesa M at an almost constant speed, and therefore a planar shape of the electrically-conductive region 210B becomes a shape reflecting an external shape of the mesa M, i.e., a circular shape, and a center of the shape almost matches an axial direction (the line with alternate long and short dashes) of the mesa M. In the present exemplary embodiment, the mesa M has a columnar structure.

An annular p-side electrode 212 made of a metal in which Ti/Au and the like are stacked is formed in a topmost layer of the mesa M. The p-side electrode 212 makes ohmic-contact with the contact layer provided in the upper DBR 208. An inner side of the annular p-side electrode 212 serves as a light outlet 212A through which laser light is emitted to an outside. That is, the VCSEL emits light in a direction perpendicular to the semiconductor substrate 200, and the axial direction of the mesa M is an optical axis. Furthermore, the cathode electrode 214 is formed as an n-side electrode on the rear surface of the semiconductor substrate 200. Note that a front surface of the upper DBR 208 on an inner side of the p-side electrode 212 is a light emission surface.

An insulating layer 216 is provided so as to cover the front surface of the mesa M excluding a part of the p-side electrode 212 to which an anode electrode (the anode electrode 218, which will be described later) is connected and the light outlet 212A. The anode electrode 218 is provided so as to make ohmic-contact with the p-side electrode 212 excluding the light outlet 212A. The anode electrode 218 is provided common to the plural VCSELs. That is, the p-side electrodes 212 of the plural VCSELs that constitute the light source 20 are connected in parallel by the anode electrode 218.

The VCSEL may oscillate in a single transverse mode or may oscillate in a multiple transverse mode (multi mode). Light output of a single VCSEL is, for example, 4 mW to 8 mW. Accordingly, for example, in a case where the light source 20 is constituted by 500 VCSELs, light output of the light source 20 is 2 W to 4 W. Heat generated by such a large-output light source 20 is large.

Configuration of Light Diffusing Member 30

Figure 5A:
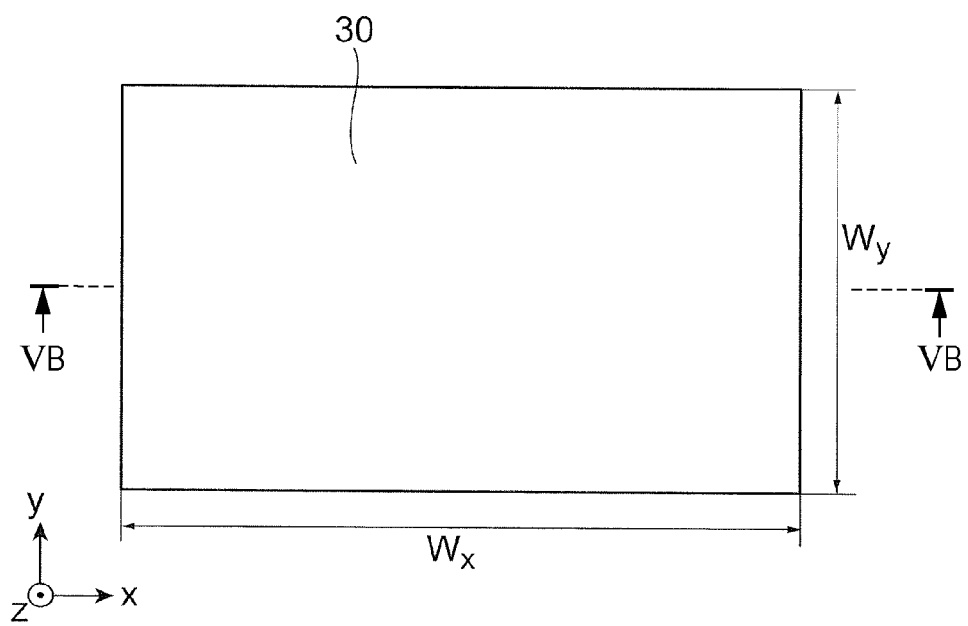
FIGS. 5A and 5B are views for explaining an example of a light diffusing member.
Figure 5B:
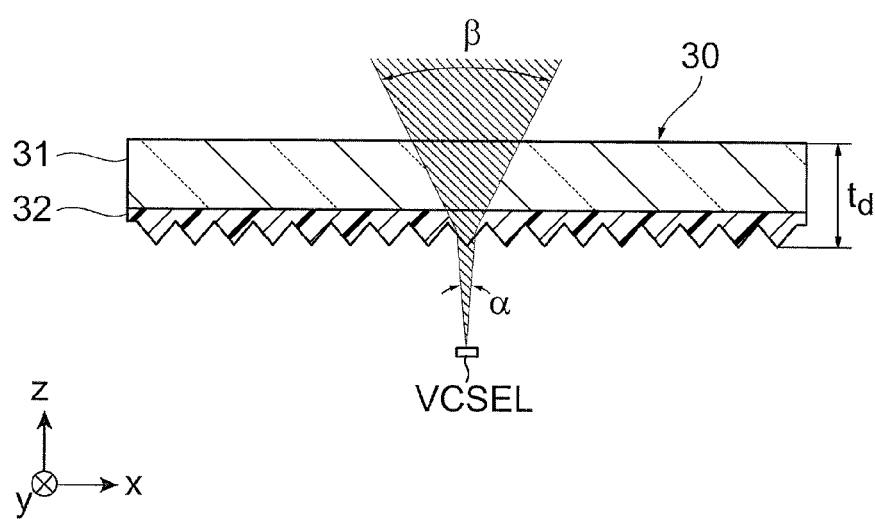

FIGS. 5A and 5B are views for explaining an example of the light diffusing member 30. FIG. 5A is a plan view, and FIG. 5B is a cross-sectional view taken along line VB-VB of FIG. 5A. In FIG. 5A, it is assumed that the rightward direction and the upward direction of the paper on which FIG. 5A is drawn are the x direction and the y direction, respectively. It is assumed that a direction orthogonal to the x direction and the y direction in anticlockwise direction is the z direction. Accordingly, in FIG. 5B, the rightward direction and the upward direction of the paper on which FIG. 5B is drawn are the x direction and the z direction, respectively.

As illustrated in FIG. 5B, the light diffusing member 30 includes a resin layer 32 having irregularities for diffusing light on one surface (in this example, a rear surface on a −z direction side) of a glass substrate 31 whose both surfaces are parallel and flat. The light diffusing member 30 further widens a divergence angle of light incident from the VCSELs of the light source 20. That is, the irregularities of the resin layer 32 of the light diffusing member 30 refract and scatter light so that a divergence angle β of output light becomes larger than a divergence angle α of the incident light. That is, as illustrated in FIG. 5B, the divergence angle β of the light that has passed through the light diffusing member 30 and has been output from the light diffusing member 30 becomes larger than the divergence angle α of the light emitted from the VCSEL (α<β). This means that use of the light diffusing member 30 increases an area of an irradiation surface irradiated with light emitted from the light source 20 as compared with a case where the light diffusing member 30 is not used. Furthermore, a light density on the irradiation surface decreases. Note that the light density is irradiance per unit area, and the divergence angles α and β are full width at half maximum (FWHM).

The light diffusing member 30 is, for example, configured such that a planar shape thereof is a quadrangle, a width $W_x$ thereof in the x direction and a vertical width $W_y$ thereof in the y direction are 1 mm to 10 mm, and a thickness $t_d$ thereof in the z direction is 0.1 mm to 1 mm. In a case where the light diffusing member 30 has the size and shape described above, the light diffusing member 30 is suitable especially for face authentication of a mobile information terminal and measurement of a relatively close range up to approximately several meters. The planar shape of the light diffusing member 30 may be any of other shapes such as a polygonal shape or a circular shape.

Driving Unit 50 and Capacitors 70

In a case where the light source 20 is driven at a higher speed, the light source 20 is desirably driven by low-side driving. The low-side driving refers to a configuration in which a driving element such as an MOS transistor is located on a downstream side of a current path relative to a target to be driven such as a VCSEL. Conversely, a configuration in which a driving element is located on an upstream side is referred to as high-side driving.

Figure 6:
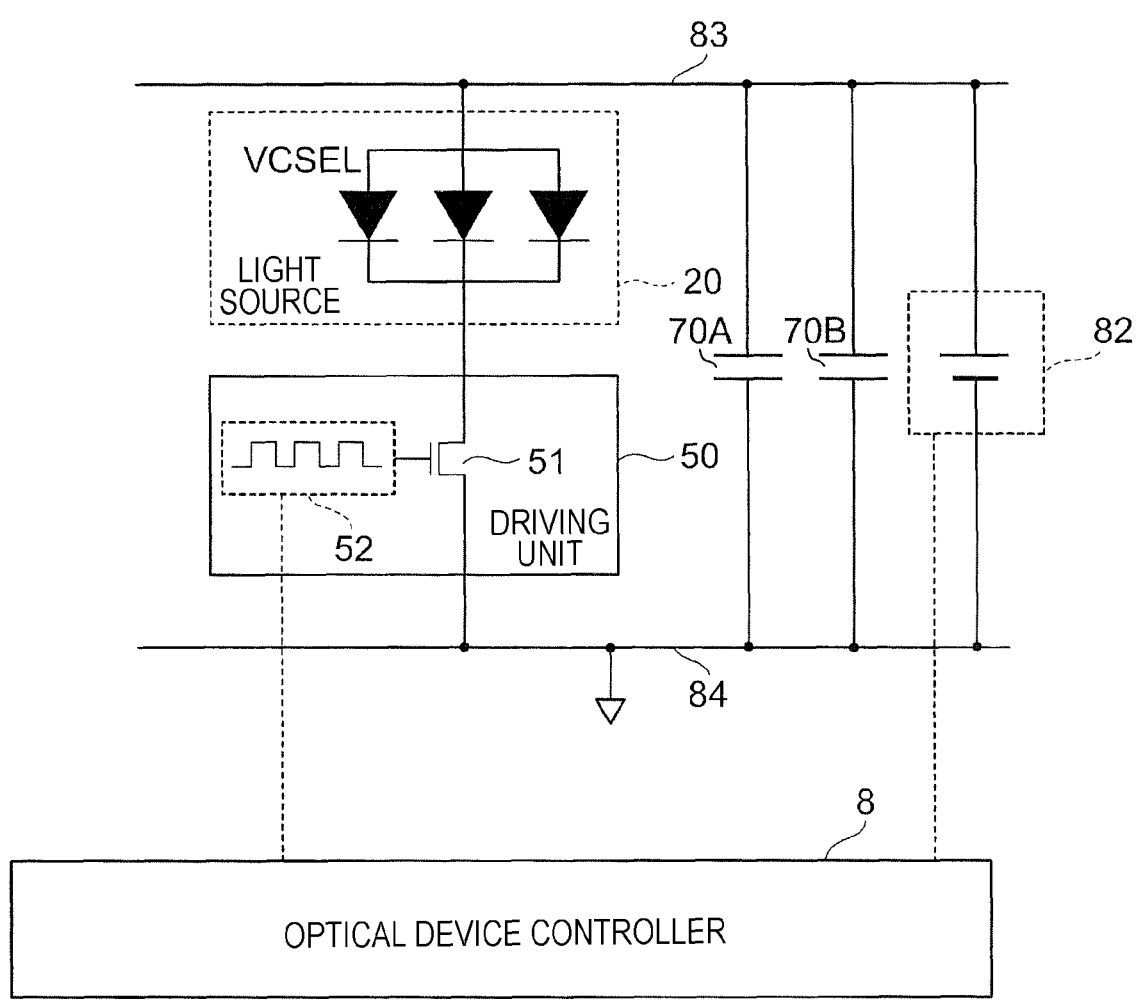
FIG. 6 illustrates an example of an equivalent circuit that drives the light source by low-side driving.

FIG. 6 illustrates an example of an equivalent circuit that drives the light source 20 by low-side driving. FIG. 6 illustrates VCSELs of the light source 20, the driving unit 50, the capacitors 70A and 70B, and a power source 82.

The power source 82 is provided in the optical device controller 8 illustrated in FIG. 2. The power source 82 generates a direct-current voltage whose +side is a power source potential and whose − side is a ground potential. The power source potential is supplied to a power source line 83, and the ground potential is supplied to a ground line 84.

The light source 20 is constituted by plural VCSELs that are connected in parallel as described above. The anode electrode 218 (see FIG. 4) of the VCSELs is connected to the power source line 83 through the anode wires 11A and 11B (see FIG. 7, which will be described later) provided on the substrate 10.

The driving unit 50 includes an n-channel MOS transistor 51 and a signal generating circuit 52 that turns the MOS transistor 51 on an off. A drain of the MOS transistor 51 is connected to the cathode electrode 214 (see FIG. 4) of the VCSELs through the cathode wire 12 (see FIG. 7, which will be described later) provided on the substrate 10. A source of the MOS transistor 51 is connected to the ground line 84. A gate of the MOS transistor 51 is connected to the signal generating circuit 52. That is, the VCSELs of the light source 20 and the MOS transistor 51 of the driving unit 50 are connected in series between the power source line 83 and the ground line 84. The signal generating circuit 52 generates an "H level" signal that turns the MOS transistor 51 on and an "L level" signal that turns the MOS transistor 51 off under control of the optical device controller 8.

One terminal of the capacitor 70A and one terminal of the capacitor 70B are connected to the power source line 83, and the other terminal of the capacitor 70A and the other terminal of the capacitor 70B are connected to the ground line 84. That is, the capacitors 70A and 70B are connected in parallel with the power source 82. Note that the capacitors 70A and 70B are, for example, electrolytic capacitors or ceramic capacitors.

Next, a driving method for driving the light source 20 that is low-side driving is described.

First, it is assumed that a signal generated by the signal generating circuit 52 of the driving unit 50 is an "L level". In this case, the MOS transistor 51 is in an off state. That is, no electric current flows between the source and the drain of the MOS transistor 51. Accordingly, no electric current flows through the VCSELs that are connected in series with the MOS transistor 51. The VCSELs do not emit light.

In this state, the capacitors 70A and 70B are charged by the power source 82. That is, the one terminal of the capacitor 70A and the one terminal of the capacitor 70B that are connected to the power source line 83 become a power source potential, and the other terminal of the capacitor 70A and the other terminal of the capacitor 70B that are connected to the ground line 84 become a ground potential. The capacitors 70A and 70B accumulates an electric charge determined by capacitance, a power source voltage (the power source potential−the ground potential), and a time.

Next, when the signal generated by the signal generating circuit 52 of the driving unit 50 becomes an "H level", the MOS transistor 51 shifts from an off state to an on state. This causes the electric charge accumulated in the capacitors 70A and 70B to flow (be discharged) to the MOS transistor 51 and the VCSELs that are connected in series. As a result, the VCSELs emit light.

Then, when the signal generated by the signal generating circuit 52 of the driving unit 50 becomes an "L level", the MOS transistor 51 shifts from an on state to an off state. This stops light emission of the VCSELs. This causes the power source 82 to resume accumulation of an electric charge in the capacitors 70A and 70B.

As described above, when the signal output by the signal generating circuit 52 repeatedly switches between the "L level" and the "H level", the MOS transistor 51 repeatedly turns on and off, and non-light-emission, which is a state where light emission is being stopped, and light emission of the VCSELs are repeated. That is, a light pulse is emitted from the VCSELs. The repeated on and off of the MOS transistor 51 is sometimes referred to as switching.

Although an electric charge (electric current) may be directly supplied from the power source 82 to the VCSELs without providing the capacitors 70A and 70B, a rise time of light emission of the VCSELs is shortened in a case where an electric charge is accumulated in the capacitors 70A and 70B and the accumulated electric charge is discharged when the MOS transistor 51 shifts from an off state to an on state so that an electric current is rapidly supplied to the VCSELs.

The substrate 10 is a multilayer (e.g., three-layer) substrate. That is, the substrate 10 includes a first electrically-conductive layer, a second electrically-conductive layer, and a third electrically-conductive layer from a side on which the members such as the light source 20 and the driving unit 50 are mounted. An insulating layer is provided between the first electrically-conductive layer and the second electrically-conductive layer and between the second electrically-conductive layer and the third electrically-conductive layer. For example, the third electrically-conductive layer is used as the power source line 83, and the second electrically-conductive layer is used as the ground line 84. The first electrically-conductive layer forms the anode wires 11A and 11B and the cathode wire 12 (see FIG. 7, which will be described later) of the light source 20 and forms a circuit pattern of a terminal or the like to which the members such as the capacitors 70A and 70B are connected. The first electrically-conductive layer, the second electrically-conductive layer, and the third electrically-conductive layer are made, for example, of an electrically-conductive material such as electrically-conductive paste containing a metal such as copper (C) or silver (Ag) or these metals. The insulating layer is made, for example, of an epoxy resin or ceramic. A front surface and a rear surface of the substrate 10 are coated with insulating coating 13 made of a material such as polyimide by a method such as screen printing. Parts where a wire and a terminal that require electric connection are provided are not coated with the coating 13 so that the electrically-conductive material that constitutes the wire and the terminal is exposed. The coating 13 has poorer thermal conductivity than the electrically-conductive material of which the first electrically-conductive layer, the second electrically-conductive layer, and the third electrically-conductive layer are made. The coating 13 is sometimes called solder resist.

The power source line 83 of the third electrically-conductive layer is connected to the anode wires 11A and 11B (see FIG. 7, which will be described later) provided in the first electrically-conductive layer through a via. Similarly, the ground line 84 of the second electrically-conductive layer is connected, through a via, to the cathode wire 12 (see FIG. 7, which will be described later) provided in the first electrically-conductive layer, a terminal to which the source of the MOS transistor 51 of the driving unit 50 is connected, and the like. According to the configuration in which the substrate 10 is a multilayer substrate, the power source line 83 is formed by the third electrically-conductive layer, and the ground line 84 is formed by the second electrically-conductive layer as described above, fluctuation of the power source potential and the ground potential is easily kept small.

Light-Emitting Device 4

Next, the light-emitting device 4 is described in detail.

FIGS. 7A and 7B are views for explaining the light-emitting device 4 to which the first exemplary embodiment is applied. FIG. 7A is a plan view, and FIG. 7B is a cross-sectional view taken along line VIIB-VIIB of FIG. 7A.

In FIG. 7A, it is assumed that the rightward direction and the upward direction of the paper on which FIG. 7A is drawn are the x direction and the y direction, respectively. It is assumed that a direction orthogonal to the x direction and the y direction in anticlockwise direction is the z direction. Accordingly, in FIG. 7B, the rightward direction and the upward direction of the paper on which FIG. 7B is drawn are the x direction and the z directions, respectively. The same applies to similar drawings that will be described later.

On the substrate 10 illustrated in FIG. 7A, the anode wires 11A and 11B and the cathode wire 12 formed by the first electrically-conductive layer are illustrated. In the cross-sectional view of the substrate 10 illustrated in FIG. 7B, the anode wires 11A and 113 and the cathode wire 12 formed by the first electrically-conductive layer are illustrated, and description of the second electrically-conductive layer that forms the ground line 84 and the third electrically-conductive layer that forms the power source line 83 is omitted. Note that the anode wire 11A is connected to the power source line 83 formed by the third electrically-conductive layer.

As illustrated in FIG. 7A, the anode wires 11A and 11B are provided so as to face each other in the y direction. The cathode wire 12 is provided between the anode wires 11A and 11B. The anode wires 11A and 11B and the cathode wire 12 are spaced apart from each other by a predetermined interval so as not to be short-circuited. The same applies to other cases.

The light source 20 is provided on the cathode wire 12. A part of the cathode wire 12 on which the light source 20 is mounted is an uncoated region 12n that is not coated with the coating 13 so that the cathode electrode 214 of the light source 20 and the cathode wire 12 are electrically connected. The cathode electrode 214 of the light source 20 is fixedly attached to the uncoated region 12n of the cathode wire 12 with use of an electrically-conductive adhesive. That is, the cathode electrode 214 of the light source 20 makes contact with the cathode wire 12.

Meanwhile, the anode electrode 218 of the light source 20 and the anode wires 11A and 11B are connected through bonding wires 23A and 23B. The anode electrode 218 and the anode wire 11A are connected through the bonding wire 23A on the side surface 21A side of the light source 20, and the anode electrode 218 and the anode wire 11B are connected through the bonding wire 23B on the side surface 21B side of the light source 20. A part of the anode wire 11A to which the bonding wire 23A is connected is an uncoated region 11An. Similarly, a part of the anode wire 11B to which the bonding wire 23B is connected is an uncoated region 11Bn. Note that a part other than the uncoated regions 12n, 11An, and 11Bn is coated with the coating 13.

As is clear from FIG. 3, the array of the VCSELs is provided at a center of the light source 20 in plan view. Accordingly, to connect the anode electrode 218 and the anode wire 11A or the anode wire 11B, the anode wire 11A or the anode wire 11B is connected to a peripheral part of the anode electrode 218 provided on the front surface of the light source 20 through the bonding wire 23A or the bonding wire 23B.

In this example, the anode wires 11A and 11B are provided on the side surfaces 21A and 21B of the light source 20 on the ±y direction sides and are connected to the anode electrode 218 through the bonding wires 23A and 23B, respectively. With this configuration, electric currents are supplied to the light source 20 concurrently from the y direction sides. If a bonding wire is provided on either the +y direction side or the −y direction side of the anode electrode 218 and an electric current is supplied to the light source 20, a VCSEL closer to the bonding wire has a higher current density and a higher light intensity, and a VCSEL farther from the bonding wire has a lower current density and a lower light intensity. That is, imbalance in output light intensity is more likely to occur among the plural VCSELs of the light source 20.

The one terminal of the capacitor 70A is connected to the anode wire 11A. The anode wire 11A is connected to the power source line 83 formed by the third electrically-conductive layer. Accordingly, the one terminal of the capacitor 70A is connected to the power source line 83. The other terminal of the capacitor 70A is connected to the ground line 84 formed by the second electrically-conductive layer through a via (not illustrated) (see FIG. 6). The one terminal of the capacitor 70B is connected to the anode wire 11B. The anode wire 11B is connected to the power source line 83 formed by the third electrically-conductive layer. Accordingly, the one terminal of the capacitor 70B is connected to the power source line 83. The other terminal of the capacitor 70B is connected to the ground line 84 formed by the second electrically-conductive layer through a via (not illustrated) (see FIG. 6).

As described above, since the anode electrode 218 of the light source 20 is connected to the different anode wires 11A and 11B through the bonding wires 23A and 23B provided in the ±y directions, the capacitors 70A and 70B are provided for the anode wires 11A and 11B, respectively.

In FIG. 7A, the driving unit 50 is connected to the cathode wire 12. This is because the drain of the MOS transistor 51 of the driving unit 50 is connected to the cathode of the VCSELs of the light source 20 as illustrated in FIG. 6. The source of the MOS transistor 51 is connected to the ground line 84 formed by the second electrically-conductive layer through a via (not illustrated). Furthermore, the signal generating circuit 52 of the driving unit 50 is connected to the power source line 83 formed by the third electrically-conductive layer and the ground line 84 formed by the second electrically-conductive layer through a via (not illustrated).

On the substrate 10, the members such as the light source 20 and the driving unit 50 are provided, and the light diffusing member 30 is provided so as to overlap the light source 20 in plan view with the holding unit 60 interposed therebetween, as illustrated in FIG. 7B. The light diffusing member 30 is provided on an optical axis of the light source 20. That is, the light diffusing member 30 is provided so as to cover the light source 20 so that the light source 20 and the light diffusing member 30 overlap each other in plan view. This causes light emitted from the light source 20 to pass through the light diffusing member 30 so that an object to be measured provided in an outside is irradiated with the light.

As illustrated in FIG. 7A, the holding unit 60 is constituted by four walls 61A, 61B, 62A, and 62B that are provided so as to surround the light source 20. The walls 61A and 61B face each other with the light source 20 interposed therebetween, and the walls 62A and 62B connect the walls 61A and 61B and face each other with the light source 20 interposed therebetween. That is, the walls 61A, 61B, 62A, and 62B constitute sides of a quadrangle in plan view. The walls 61A, 61B, 62A, and 62B are attached so that lower surfaces thereof (−z direction side) make contact with the substrate 10 side and upper surfaces thereof (+z direction side) make contact with the light diffusing member 30. That is, four sides of the light diffusing member 30 whose planar shape is a rectangle are held by the walls 61A, 61B, 62A, and 62B of the holding unit 60. In a case where the walls 61A, 61B, 62A, and 62B are not distinguished from each other, the walls 61A, 61B, 62A, and 62B are sometimes referred to as walls.

The holding unit 60 is, for example, a member that is integrally molded from a resin material such as liquid crystal polymer or an insulating material such as ceramic, and a thickness of the walls of the holding unit 60 is 300 µm, and a height of the walls of the holding unit 60 is 450 µm to 550 µm. The holding unit 60 is desirably configured to absorb light emitted from the light source 20. For example, the color of the holding unit 60 is black. This keeps light emitted from the light source 20 toward the walls from radiating to an outside without passing through the light diffusing member 30.

As illustrated in FIGS. 7A and 7B, the lower surface of the holding unit 60 is provided on the anode wires 11A and 11B and the cathode wire 12 in a region that is not coated with the coating 13. That is, the lower surface of the holding unit 60 makes contact with the anode wires 11A and 11B and the cathode wire 12 made of an electrically-conductive material without the coating 13 interposed therebetween. This allows heat generated by the light source 20 to be released from the substrate 10 through the anode wires 11A and 11B and the cathode wire 12 and allows the heat to easily transmit to the holding unit 60 from the anode wires 11A and 11B and the cathode wire 12 that are not coated with the coating 13 and be released from the light diffusing member 30. Note that the holding unit 60 is desirably made of a material, such as ceramic (e.g., aluminum nitride or silicon nitride), having good thermal conductivity.

The light source 20 and the wires such as the anode wires 11A and 11B and the cathode wire 12 may be directly provided on the substrate 10. Alternatively, the light source 20 and the wires such as the anode wires 11A and 11B and the cathode wire 12 may be directly provided on a base member such as a base member for heat release made of a material, such as ceramic (e.g., aluminum nitride or silicon nitride), having good thermal conductivity, and this base member may be provided on the substrate 10.

Light-Emitting Device 4' for Comparison

Figure 8A:
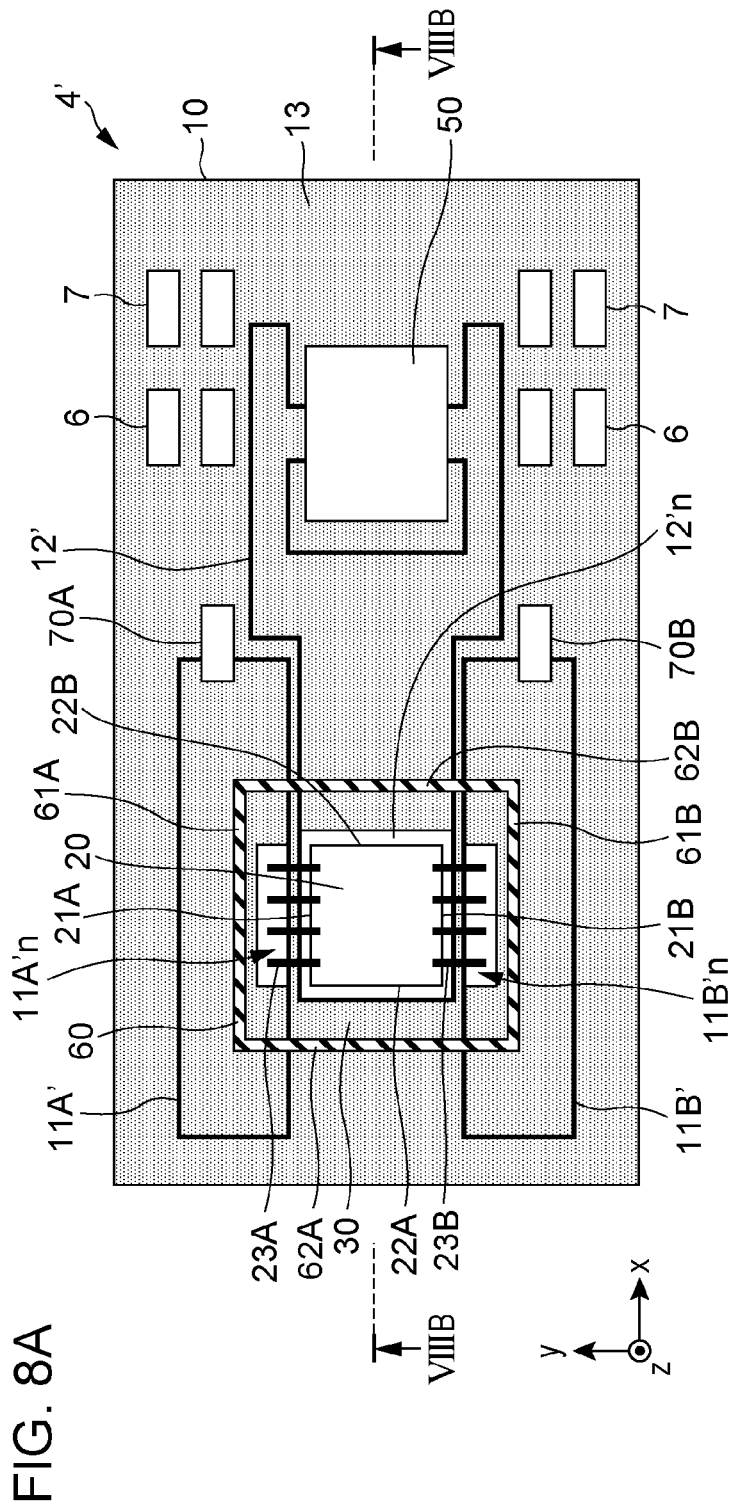
FIGS. 8A and 8B are views for explaining a light-emitting device for comparison.
Figure 8B:
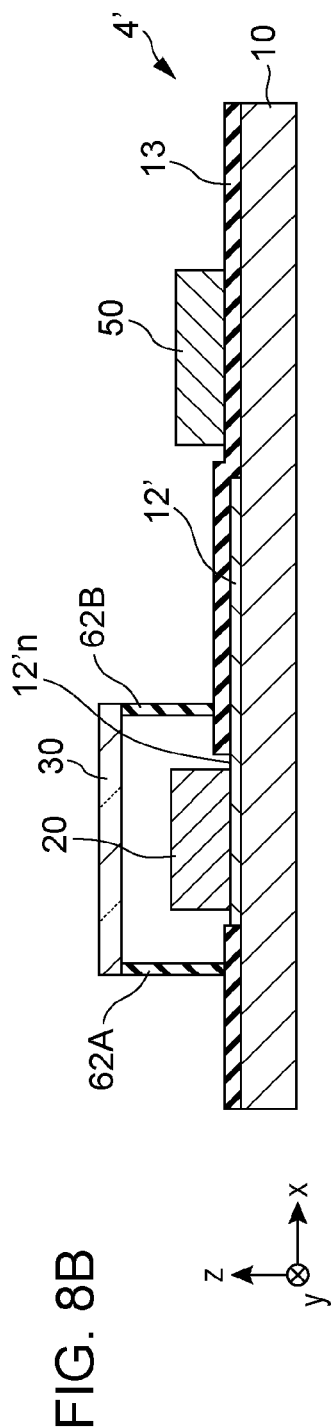

FIGS. 8A and 8B are views for explaining a light-emitting device 4' for comparison. FIG. 8A is a plan view, and FIG. 8B is a cross-sectional view taken along line VIIIB-VIIIB of FIG. 8A. In the following description, parts identical to the parts of the light-emitting device 4 to which the first exemplary embodiment illustrated in FIGS. 7A and 7B is applied are given identical reference signs, and description thereof is omitted. The following describes differences from the first exemplary embodiment. The light-emitting device 4' is referred to as the light-emitting device 4' according to a comparative example.

As illustrated in FIG. 8A, the light-emitting device 4' according to the comparative example is configured such that parts of anode wires 11A' and 11B' to which bonding wires 23A and 23B are connected are uncoated regions 11A'n and 11B'n. Furthermore, only a part of the cathode wire 12' with which the cathode electrode 214 of the light source 20 makes contact is an uncoated region 12'n. A region other than the uncoated regions 11A'n, 11B'n, and 12'n is coated with the coating 13. Accordingly, parts where the walls 61A, 61B, 62A, and 62B of the holding unit 60 make contact with the anode wires 11A' and 11B' and the cathode wire 12' are coated with the coating 13. That is, the holding unit 60 is provided on the anode wires 11A' and 11B' and the cathode wire 12' in a region coated with the coating 13. The holding unit 60 makes contact with the anode wires 11A' and 11B' and the cathode wire 12' with the coating 13 interposed therebetween.

The coating 13 has lower thermal conductivity than the electrically-conductive material of which the anode wires 11A' and 11B' and the cathode wire 12' are made. Accordingly, in the light-emitting device 4', thermal resistance between (i) the anode wires 11A' and 11B' and the cathode wire 12' and (ii) the holding unit 60 is larger and heat is less likely to transmit from the anode wires 11A' and 11B' and the cathode wire 12' to the holding unit 60 than in the light-emitting device 4. This makes it harder for heat generated by the light source 20 to transmit to the holding unit 60 and be released from the light diffusing member 30. That is, in the light-emitting device 4', heat from the light source 20 is harder to be released than in the light-emitting device 4. It is therefore necessary to keep electric power supplied to the light source 20 small and keep a light intensity of the light source 20 low in order to keep a temperature of the light source 20 equal to or lower than a predetermined temperature.

In the light-emitting device 4 to which the first exemplary embodiment is applied, the holding unit 60 makes contact with the anode wires 11A and 11B and the cathode wire 12 without the coating 13 interposed therebetween. With this configuration, efficiency of heat release from the light source 20 is higher in the light-emitting device 4 than in the light-emitting device 4'. In the light-emitting device 4, it is therefore easy to keep the temperature of the light source 20 equal to or lower than the predetermined temperature even in a case where electric power supplied to the light source 20 is increased. Consequently, an intensity of light from the light source 20 may be increased.

Second Exemplary Embodiment

A light-emitting device 4A to which a second exemplary embodiment is applied is different from the light-emitting device 4 to which the first exemplary embodiment is applied in terms of a shape of anode wires provided on a substrate 10 and thereby improves the effect of heat release from a light source 20. In the following description, parts identical to the parts of the light-emitting device 4 to which the first exemplary embodiment is applied illustrated in FIGS. 7A and 7B are given identical reference signs, and description thereof is omitted. The following describes differences from the first exemplary embodiment.

Figure 9A:
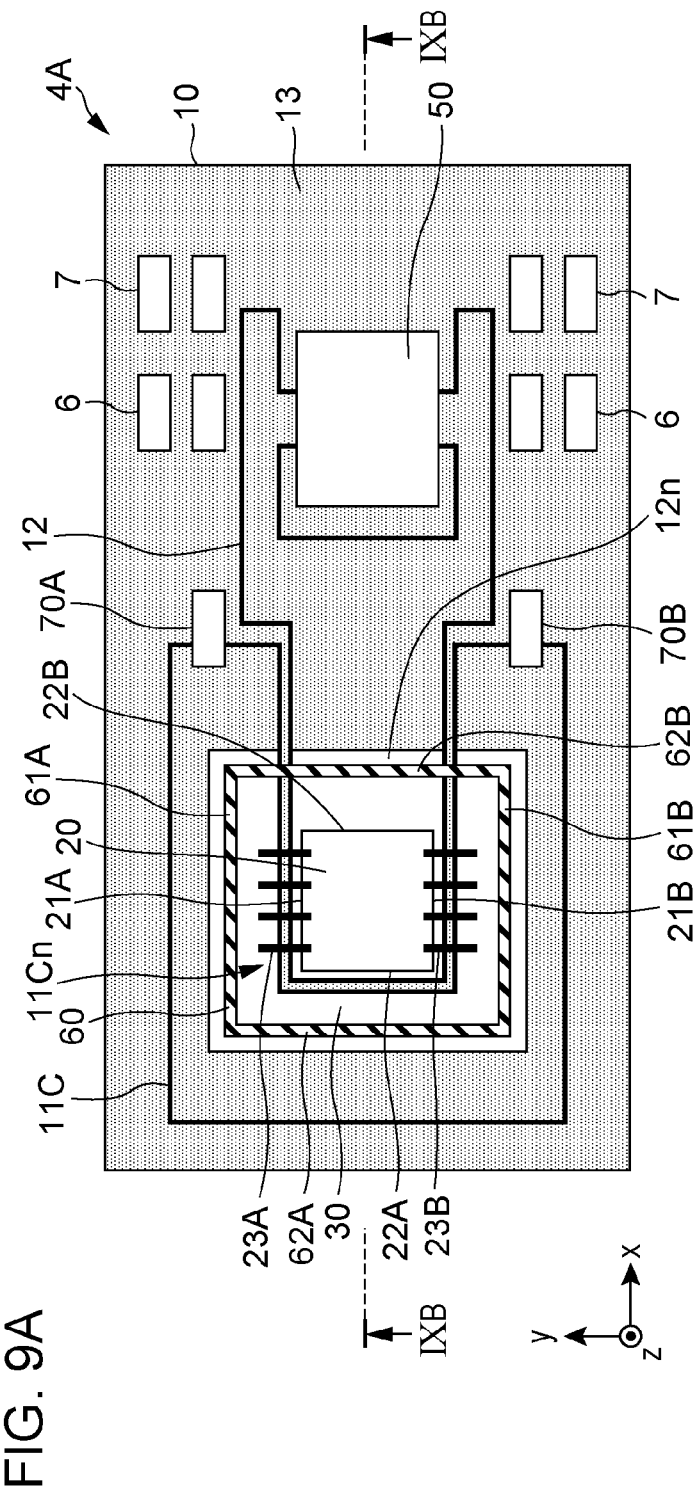
FIGS. 9A and 9B are views for explaining a light-emitting device to which a second exemplary embodiment is applied.
Figure 9B:
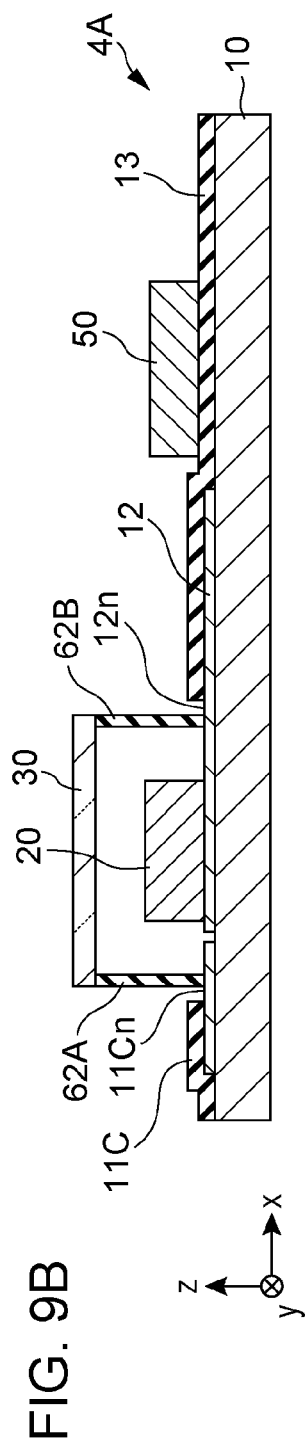

FIGS. 9A and 9B are views for explaining the light-emitting device 4A to which the second exemplary embodiment is applied. FIG. 9A is a plan view, and FIG. 9B is a cross-sectional view taken along line IXB-IXB of FIG. 9A.

As illustrated in FIG. 9A, the light-emitting device 4A has an anode wire 11C, which is obtained by connecting the anode wires 11A and 11B of the light-emitting device 4 illustrated in FIG. 7A on an outer side of a cathode wire 12 on the −x direction side. A whole wall 62A of a holding unit 60 overlaps the anode wire 11C. A part of the anode wire 11C which the wall 62A overlaps is an uncoated region 11Cn that is not coated with coating 13. The light-emitting device 4A is also configured such that the holding unit 60 is provided on the anode wire 11C and the cathode wire 12 in a region that is not coated with the coating 13.

In the light-emitting device 4 illustrated in FIG. 7A, the anode wires 11A and the anode wire 11B are not connected to each other. Accordingly, the insulating layer between the first electrically-conductive layer and the second electrically-conductive layer of the substrate 10 is exposed between the anode wire 11A and the anode wire 11B on the −x direction side of the light source 20. A part of the wall 62A of the holding unit 60 is provided on the insulating layer. Accordingly, heat generated by the light source 20 is hard to transmit to the part of the wall 62A of the holding unit 60 that is located on the insulating layer.

As described above, a contact area in which the holding unit 60 makes contact with an anode wire (specifically, the anode wire 11C) without the coating 13 interposed therebetween in the light-emitting device 4A is larger than a contact area in which the holding unit 60 makes contact with anode wires (specifically, the anode wires 11A and 11B) in the light-emitting device 4. This achieves higher heat release efficiency.

Third Exemplary Embodiment

In the light-emitting device 4A to which the second exemplary embodiment is applied, heat release efficiency is improved by changing a shape of an anode wire of the light-emitting device 4 to which the first exemplary embodiment is applied. In a light-emitting device 4B to which a third exemplary embodiment is applied, efficiency of heat release from a light source 20 is improved by changing a shape of a cathode wire. In the following description, parts identical to the parts of the light-emitting device 4 to which the first exemplary embodiment is applied illustrated in FIGS. 7A and 7B are given identical reference signs, and description thereof is omitted. The following describes differences from the first exemplary embodiment.

FIGS. 10A and 10B are views for explaining the light-emitting device 4B to which the third exemplary embodiment is applied. FIG. 10A is a plan view, and FIG. 10B is a cross-sectional view taken along line XB-XB of FIG. 10A.

As illustrated in FIG. 10A, the light-emitting device 4B has a cathode wire 12A, which is obtained by stretching the cathode wire 12 in the light-emitting device 4 illustrated in FIG. 7A toward the −x direction side. That is, the stretched cathode wire 12A is provided between the anode wires 11A and 11B of the light-emitting device 4. Furthermore, an uncoated region 12An is provided, which is obtained by stretching a part of the cathode wire 12 of the light-emitting device 4 that is not coated with coating toward the −x direction side. Accordingly, a part of a wall 62A of a holding unit 60, which makes contact with the insulating layer of the substrate 10 in the light-emitting device 4, overlaps the cathode wire 12A. The part of the cathode wire 12A which the wall 62A overlaps is not coated with coating 13. Accordingly, in the light-emitting device 4B, heat transfers to the wall 62A of the holding unit 60 not only from the anode wires 11A and 11B, but also from the cathode wire 12A. That is, in the light-emitting device 4B, the holding unit 60 is provided on the anode wires 11A and 11B and the cathode wire 12A in a region that is not coated with the coating 13.

Therefore, a contact area in which the holding unit 60 makes contact with a cathode wire (specifically, the cathode wire 12A) in the light-emitting device 4B is larger than a contact area in which the holding unit 60 makes contact with a cathode wire (specifically, the cathode wire 12) in the light-emitting device 4, as in the light-emitting device 4A according to the second exemplary embodiment. This achieves higher heat release efficiency.

Fourth Exemplary Embodiment

In the light-emitting device 4B to which the third exemplary embodiment is applied, efficiency of heat release from the light source 20 is improved by stretching the cathode wire 12 of the light-emitting device 4 to which the first exemplary embodiment is applied toward the −x direction side. In a light-emitting device 4C to which a fourth exemplary embodiment is applied, efficiency of heat release from a light source 20 is improved by further changing a shape of a cathode wire. In the following description, parts identical to the parts of the light-emitting device 4 to which the first exemplary embodiment is applied illustrated in FIGS. 7A and 7B are given identical reference signs, and description thereof is omitted. The following describes differences from the first exemplary embodiment.

Figure 11A:
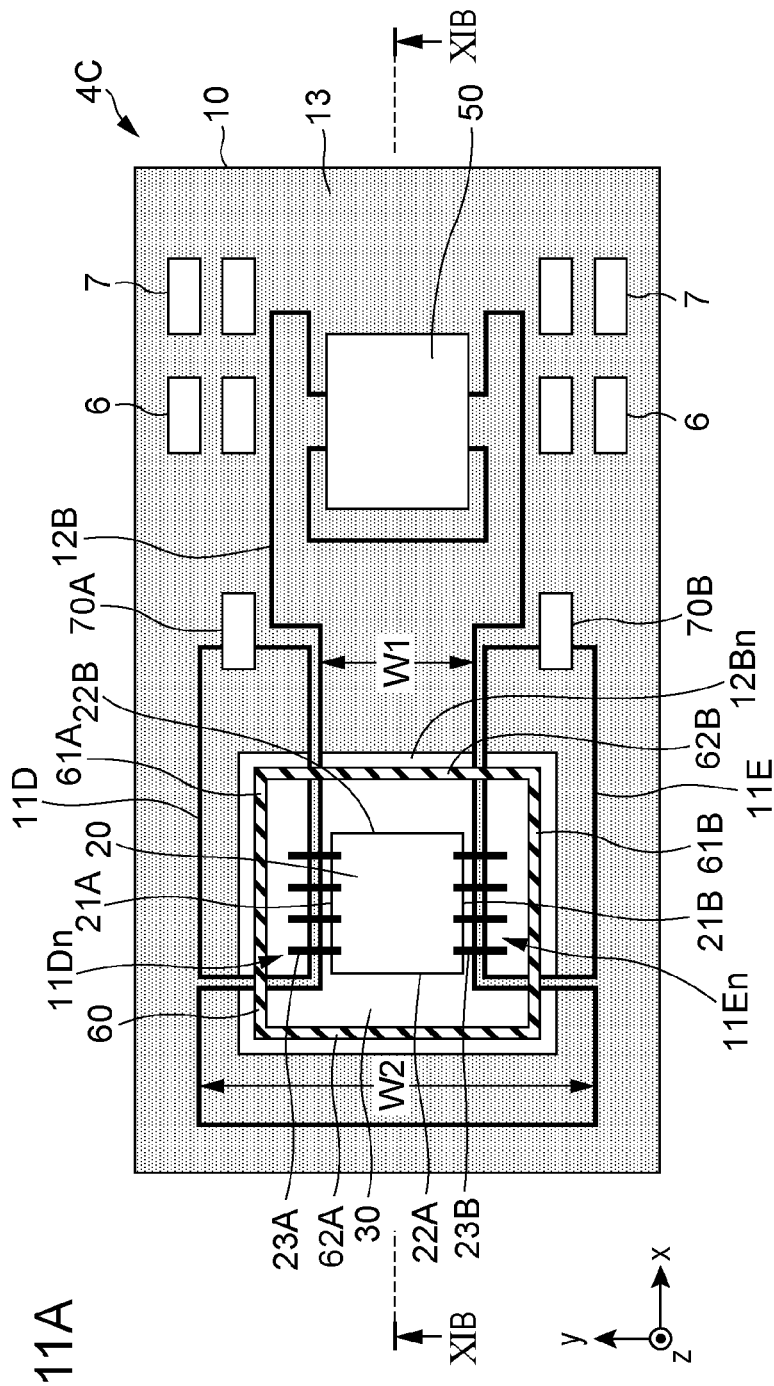
FIGS. 11A and 11B are views for explaining a light-emitting device to which a fourth exemplary embodiment is applied.
Figure 11B:
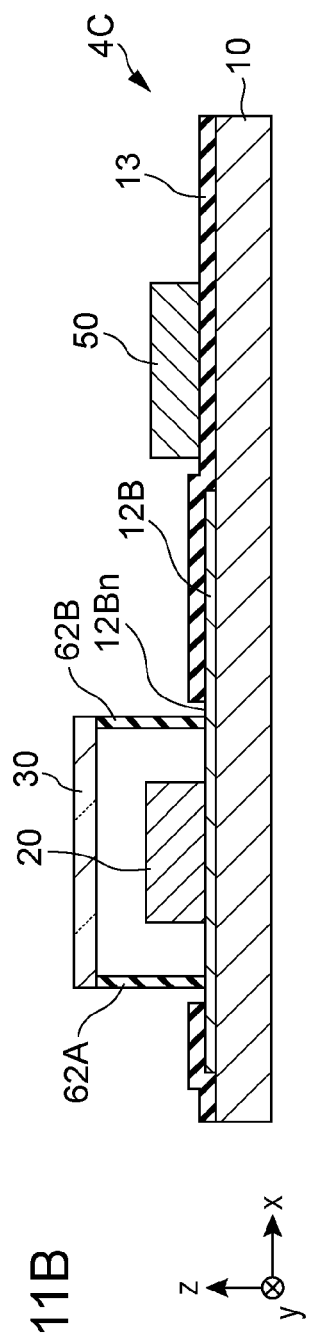

FIGS. 11A and 11B are views for explaining the light-emitting device 4C to which the fourth exemplary embodiment is applied. FIG. 11A is a plan view, and FIG. 11B is a cross-sectional view taken along line XIB-XIB of FIG. 11A.

As illustrated in FIG. 11A, the light-emitting device 4C has anode wires 11D and 11E, which are obtained by shortening ends of the anode wires 11A and 11B on the −x direction side in the light-emitting device 4B illustrated in FIG. 10A toward the +x direction side, and a cathode wire 12B, which is obtained by stretching an end of the cathode wire 12A on the −x direction side toward the ±y direction sides. That is, in the light-emitting device 4C, a width (a width W2 in FIG. 11A), in the ±y directions, of the end of the cathode wire 12B on the −x direction side is larger than a width (a width W1 in FIG. 11A), in the ±y directions, of a part of the cathode wire 12B with which the light source 20 makes contact (W2>W1).

A part of the cathode wire 12B which a holding unit 60 overlaps is not coated with coating 13. Accordingly, in the light-emitting device 4C, a contact area of the holding unit 60 with the cathode wire 12B is larger than in the light-emitting device 4B. That is, also in the light-emitting device 4C, the holding unit 60 is provided in on the anode wires 11D and 11E and the cathode wire 12B in a region that is not coated with the coating 13.

Heat generated by the light source 20 is easier to transmit to the cathode wire 12B that is in direct contact with a cathode electrode 214 than to anode wires (the anode wires 11A and 11B or the anode wire 11C) from an anode electrode 218 through bonding wires 23A and 23B.

In the light-emitting device 4C, a contact area of the holding unit 60 with a cathode wire (specifically, the cathode wire 12B) is larger than a contact area of the holding unit 60 with a cathode wire (specifically, the cathode wire 12A) in the light-emitting device 4B. This achieves higher heat release efficiency.

Fifth Exemplary Embodiment

In the light-emitting device 4' (see FIGS. 8A and 8B) according to the comparative example described in the first exemplary embodiment, the holding unit 60 makes contact with the anode wires 11A' and 11B' and the cathode wire 12' with the coating 13 interposed therebetween. However, in a case where the holding unit 60 makes contact with any of the anode wires 11A' and 11B' and the cathode wire 12' without the coating 13 interposed therebetween, heat release efficiency improves as compared with the light-emitting device 4'.

FIGS. 12A and 12B are views for explaining a light-emitting device 4D to which the fifth exemplary embodiment is applied. FIG. 12A is a plan view, and FIG. 12B is a cross-sectional view taken along line XIIB-XIIB of FIG. 12A.

As illustrated in FIG. 12A, in the light-emitting device 4D, a part of a cathode wire 12C where the cathode wire 12C and a holding unit 60 overlap each other in the light-emitting device 4' according to the comparative example illustrated in FIG. 8A is not coated with coating 13. That is, a part of the cathode wire 12C with which a part of a wall 62B of the holding unit 60 that overlaps the cathode wire 12C makes contact is not coated with the coating 13. As for the anode wires 11A' and 11B', only parts of the anode wires 11A' and 11B' that are connected to the anode electrode 218 of the light source 20 through the bonding wires 23A and 23B are not coated with the coating 13 and is exposed.

This allows heat that transmits from the light source 20 to the cathode wire 12C to easily transmit to the holding unit 60. Accordingly, the light-emitting device 4D has improved efficiency of heat release from the light source 20 as compared with the light-emitting device 4'.

Sixth Exemplary Embodiment

In the fifth exemplary embodiment, a part of the cathode wire 12C that overlaps the holding unit 60 is not coated with the coating 13 and is exposed. In a sixth exemplary embodiment, an anode wire that overlaps a holding unit 60 is not coated with coating 13 and is exposed.

FIGS. 13A and 13B are views for explaining a light-emitting device 4E to which the sixth exemplary embodiment is applied. FIG. 13A is a plan view, and FIG. 13B is a cross-sectional view taken along line XIIIB-XIIIB of FIG. 13A.

As illustrated in FIG. 13A, the light-emitting device 4E has an anode wire 11D, which is obtained by exposing the anode wire 11B' without coating the anode wire 11B' with the coating 13 in the light-emitting device 4' according to the comparative example illustrated in FIG. 8A. With this configuration, a part of the holding unit 60 that overlaps the anode wire 11D makes contact with the anode wire 11D without the coating 13 interposed therebetween. As for an anode wire 11A, only a part of the anode wire 11A' that is connected to an anode electrode 218 of a light source 20 through a bonding wire 23A is not coated with the coating 13 and is exposed. As for a cathode wire 12', a part of the cathode wire 12' with which a cathode electrode 214 of the light source 20 makes contact is not coated with the coating 13 and is exposed.

This allows heat that transfers from the light source 20 to the anode wire 11D through a bonding wire 23B to easily transmit to the holding unit 60. Accordingly, the light-emitting device 4E has improved efficiency of heat release from the light source 20 as compared with the light-emitting device 4'.

Although the anode wire 11B of the light-emitting device 4' according to the comparative example illustrated in FIG. 8A is not coated with the coating 13 in the light-emitting device 4E as illustrated in FIG. 13A, the light-emitting device 4E may be configured such that a part of the anode wire 11B with which the holding unit 60 makes contact is not coated with the coating 13.

Furthermore, the sixth exemplary embodiment may be applied to the anode wire 11A' instead of the anode wire 11B'.

Although the light diffusing member 30 is used in the first through sixth exemplary embodiments, the first through sixth exemplary embodiments may be applied to a configuration in which a member that transmits light, for example, a transparent base member such as a protection covering or an optical member such as a light collecting lens or a micro lens array is used instead of the light diffusing member 30.

Furthermore, a diffractive optical element may be used as the light diffusing member 30 in each of the first through sixth exemplary embodiments. That is, a member that causes incident light to branch by diffraction is also an example of the light diffusing member 30. In a case where a diffractive optical element is used, the optical device 3 may be a light source for a structured light method instead of a device for a ToF method.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A light-emitting device comprising:
    a light diffusing member that diffuses light emitted from a light source so that an object to be measured is irradiated with the light; and
    a holding unit that holds the light diffusing member and is provided on a wire connected to the light source so as to be located in an uncoated region of the wire,
    wherein
    the light source has an anode electrode and a cathode electrode; and
    the wire is at least one of an anode wire connected to the anode electrode and a cathode wire connected to the cathode electrode,
    the light source is a light-emitting element array that has a first side surface and a second side surface that face each other and a third side surface and a fourth side surface that connect the first side surface and the second side surface and face each other; and
    the holding unit is provided on the anode wire provided on a substrate so as to be located in an uncoated region of the anode wire on both a first side surface side and a second side surface side.

2. The light-emitting device according to claim 1, wherein the wire is an anode wire connected to the anode electrode and a cathode wire connected to the cathode electrode.

3. The light-emitting device according to claim 1, wherein the holding unit is provided on the cathode wire provided on at least one of a third side surface side and a fourth side surface side so as to be located in an uncoated region of the cathode wire.

4. The light-emitting device according to claim 1, wherein the holding unit is provided on the cathode wire provided on a third side surface side and a fourth side surface side so as to be located in an uncoated region of the cathode wire.

5. The light-emitting device according to claim 1, wherein the light source is a light-emitting element array that has a first side surface and a second side surface that face each other and a third side surface and a fourth side surface that connect the first side surface and the second side surface and face each other; and
    the holding unit is provided on the anode wire provided on a substrate on a first side surface side, a second side surface side, and a third side surface side so as to be located in an uncoated region of the anode wire.

6. The light-emitting device according to claim 1, wherein the holding unit is made of ceramic.

7. An optical device comprising:
the light-emitting device according to claim 1; and
a light receiving unit that receives light emitted from the light source of the light-emitting device and reflected by the object to be measured,
wherein the light receiving unit outputs a signal corresponding to a period from the emission of the light from the light source to the reception of the light by the light receiving unit.

8. An information processing apparatus comprising:
the optical device according to claim 7; and
a shape specifying unit that specifies a three-dimensional shape of the object to be measured based on the light emitted from the light source of the optical device, reflected by the object to be measured, and received by the light receiving unit of the optical device.

9. The information processing apparatus according to claim 8, further comprising an authentication processing unit that performs authentication processing concerning use of the information processing apparatus based on a result of the specifying of the shape specifying unit.

10. A light-emitting device comprising:
a light diffusing member that diffuses light emitted from a light source so that an object to be measured is irradiated with the light; and
a holding unit that holds the light diffusing member and is provided on a wire connected to the light source so as to be located in an uncoated region of the wire, wherein
the light source has an anode electrode and a cathode electrode; and
the wire is at least one of an anode wire connected to the anode electrode and a cathode wire connected to the cathode electrode,
the holding unit is provided on the cathode wire provided on at least one of a third side surface side and a fourth side surface side so as to be located in an uncoated region of the cathode wire.

11. The light-emitting device according to claim 10, wherein
the wire is an anode wire connected to the anode electrode and a cathode wire connected to the cathode electrode.

12. The light-emitting device according to claim 10, wherein
the holding unit is provided on the cathode wire provided on a third side surface side and a fourth side surface side so as to be located in an uncoated region of the cathode wire.

13. The light-emitting device according to claim 10, wherein
the holding unit is made of ceramic.

14. An optical device comprising:
the light-emitting device according to claim 10; and
a light receiving unit that receives light emitted from the light source of the light-emitting device and reflected by the object to be measured,
wherein the light receiving unit outputs a signal corresponding to a period from the emission of the light from the light source to the reception of the light by the light receiving unit.

15. A light-emitting device comprising:
a light diffusing member that diffuses light emitted from a light source so that an object to be measured is irradiated with the light; and
a holding unit that holds the light diffusing member and is provided on a wire connected to the light source, wherein
the light source has an anode electrode and a cathode electrode; and
the wire is an anode wire connected to the anode electrode,
the light source is a light-emitting element array that has a first side surface and a second side surface that face each other and a third side surface and a fourth side surface that connect the first side surface and the second side surface and face each other; and
the holding unit is provided on the anode wire provided on a substrate so as to be located in a region of the anode wire on both a first side surface side and a second side surface side.

16. The light-emitting device according to claim 15, wherein
the holding unit is provided on the cathode wire provided on at least one of a third side surface side and a fourth side surface side so as to be located in an uncoated region of the cathode wire.

* * * * *